(12) United States Patent
Yokota

(10) Patent No.: US 11,235,526 B2
(45) Date of Patent: Feb. 1, 2022

(54) PLASTICIZING DEVICE, THREE-DIMENSIONAL MODELING DEVICE, AND INJECTION MOLDING DEVICE

(71) Applicant: Seiko Epson Corporation, Tokyo (JP)

(72) Inventor: Kei Yokota, Matsumoto (JP)

(73) Assignee: Seiko Epson Corporation

( * ) Notice: Subject to any disclaimer, the term of this patent is extended or adjusted under 35 U.S.C. 154(b) by 210 days.

(21) Appl. No.: 16/675,299

(22) Filed: Nov. 6, 2019

(65) Prior Publication Data

US 2020/0139629 A1 May 7, 2020

(30) Foreign Application Priority Data

Nov. 7, 2018 (JP) .............................. JP2018-209678
Nov. 7, 2018 (JP) .............................. JP2018-209680
Nov. 7, 2018 (JP) .............................. JP2018-209681

(51) Int. Cl.
*B29C 64/314* (2017.01)
*B29C 64/209* (2017.01)
*B29C 64/241* (2017.01)
*B29C 64/255* (2017.01)
*B29C 64/245* (2017.01)
*B33Y 40/00* (2020.01)
*B33Y 30/00* (2015.01)

(52) U.S. Cl.
CPC .......... *B29C 64/314* (2017.08); *B29C 64/209* (2017.08); *B29C 64/241* (2017.08); *B29C 64/245* (2017.08); *B29C 64/255* (2017.08); *B33Y 30/00* (2014.12); *B33Y 40/00* (2014.12)

(58) Field of Classification Search
None
See application file for complete search history.

(56) References Cited

U.S. PATENT DOCUMENTS 1,533,191 A * 4/1925 Kaiser .................... B29C 48/84
100/339
1,951,427 A * 3/1934 Lodge .................... B29C 48/85
366/87

(Continued)

FOREIGN PATENT DOCUMENTS

CN 106493651 A 3/2017
CN 106573405 A 4/2017

(Continued)

*Primary Examiner* — Xiao S Zhao
*Assistant Examiner* — Emmanuel S Luk
(74) *Attorney, Agent, or Firm* — Harness, Dickey & Pierce, P.L.C.

(57) ABSTRACT

A plasticizing device that plasticizes a material to produce a molten material includes a driving motor, a screw that has a grooved surface on which a groove is formed and rotates by the driving motor; and a barrel having a facing surface that faces the grooved surface and has a communication hole formed in the center and a heater, wherein the screw has a cooling medium flow path provided inside the screw, an inlet portion that communicates with the cooling medium flow path and introduces a cooling medium from the outside of the screw, and an outlet portion that communicates with the cooling medium flow path and discharges the cooling medium to the outside of the screw.

7 Claims, 16 Drawing Sheets

(56) References Cited

U.S. PATENT DOCUMENTS

| | | | | |
|---|---|---|---|---|
| 2,787,022 | A | * | 4/1957 | Chisholm ............... B30B 11/24 425/79 |
| 3,283,041 | A | * | 11/1966 | Sommerfeld ......... B29C 48/875 264/40.6 |
| 3,305,893 | A | * | 2/1967 | Machen ................ B29C 48/845 425/379.1 |
| 3,738,420 | A | * | 6/1973 | Poux ....................... B29C 45/74 165/87 |
| 3,870,451 | A | * | 3/1975 | Gokcen ................. B29C 44/507 425/378.1 |
| 3,946,803 | A | * | 3/1976 | Heitzer ................... B29C 48/85 165/87 |
| 4,395,376 | A | * | 7/1983 | Matthews ............... B29C 45/74 264/73 |
| 4,553,922 | A | * | 11/1985 | Winner ............... B01F 7/00816 425/381.2 |
| 4,887,907 | A | * | 12/1989 | Hahn ....................... B01F 7/008 366/99 |
| 2004/0094854 | A1 | * | 5/2004 | Danekas ............... B29C 48/845 264/40.6 |
| 2008/0017345 | A1 | * | 1/2008 | Weir ................... F28D 15/0275 164/113 |
| 2010/0127419 | A1 | * | 5/2010 | Malarkey ................ B29C 48/11 264/177.11 |
| 2016/0200024 | A1 | * | 7/2016 | Kim ..................... G05B 19/188 425/143 |
| 2017/0210069 | A1 | | 7/2017 | Stubenruss |
| 2017/0291364 | A1 | * | 10/2017 | Womer ................. B29C 48/501 |
| 2018/0311894 | A1 | | 11/2018 | Saito et al. |
| 2020/0114543 | A1 | * | 4/2020 | Conrad ............... B29B 17/0412 |

FOREIGN PATENT DOCUMENTS

| | | |
|---|---|---|
| JP | 2010-000752 A | 1/2010 |
| JP | 2010-241016 A | 10/2010 |
| WO | WO-2007-034549 A1 | 3/2007 |

\* cited by examiner

PLASTICIZING DEVICE, THREE-DIMENSIONAL MODELING DEVICE, AND INJECTION MOLDING DEVICE

The present application is based on, and claims priority from, JP Application Serial Number 2018-209678, filed Nov. 7, 2018, JP Application Serial Number 2018-209680, filed Nov. 7, 2018, and JP Application Serial Number 2018-209681, filed Nov. 7, 2018, the disclosures of which are hereby incorporated by reference herein in their entirety.

BACKGROUND

1. Technical Field

The present disclosure relates to a plasticizing device, a three-dimensional modeling device, and an injection molding device.

2. Related Art

For example, JP-A-2010-241016 discloses a plasticizing device including a rotor having a spiral groove on an end surface and a barrel that faces the end surface of the rotor, on which the spiral groove is formed, and has a communication hole in the center.

The above-described plasticizing device plasticizes a material supplied into the spiral groove by the rotation of the rotor and heating from the barrel and transports the material from an outer circumferential portion to a central portion along the spiral groove, thereby ejecting the plasticized material through the communication hole. However, when the temperature of the rotor becomes too hot, there is a possibility that the balance between the plasticization and transportation of the material may collapse and the amount of the plasticized material ejected through the communication hole may become unstable. Therefore, the present application proposes a plasticizing device that realizes a stable ejection amount.

SUMMARY

According to an aspect of the present disclosure, a plasticizing device that plasticizes a material to produce a molten material is provided. This plasticizing device includes a driving motor having a rotary shaft, a screw that has a grooved surface on which a groove is formed and rotates by the driving motor, and a barrel having a facing surface that faces the grooved surface and has a communication hole formed in the center and a heater. At least a part of the rotary shaft is coupled to the screw through a heat conduction suppression portion that suppresses the conduction of heat.

According to another aspect of the present disclosure, a plasticizing device that plasticizes a material to produce a molten material is provided. This plasticizing device includes a driving motor, a screw that has a grooved surface on which a groove is formed and rotates by the driving motor, and a barrel having a facing surface that faces the grooved surface and has a communication hole formed in the center and a heater. The screw has a cooling medium flow path provided inside the screw, an inlet portion that communicates with the cooling medium flow path and introduces a cooling medium from the outside of the screw, and an outlet portion that communicates with the cooling medium flow path and discharges the cooling medium to the outside of the screw.

According to still another aspect of the present disclosure, a plasticizing device that plasticizes a material to produce a molten material is provided. This plasticizing device includes a driving motor having a rotary shaft, a screw that has a grooved surface on which a groove is formed and rotates by the driving motor, a barrel having a facing surface that faces the grooved surface and has a communication hole formed in the center and a heater, and a case that accommodates the screw. The screw has a Peltier device in the screw.

DESCRIPTION OF EXEMPLARY EMBODIMENTS

A. First Embodiment

Figure 1:
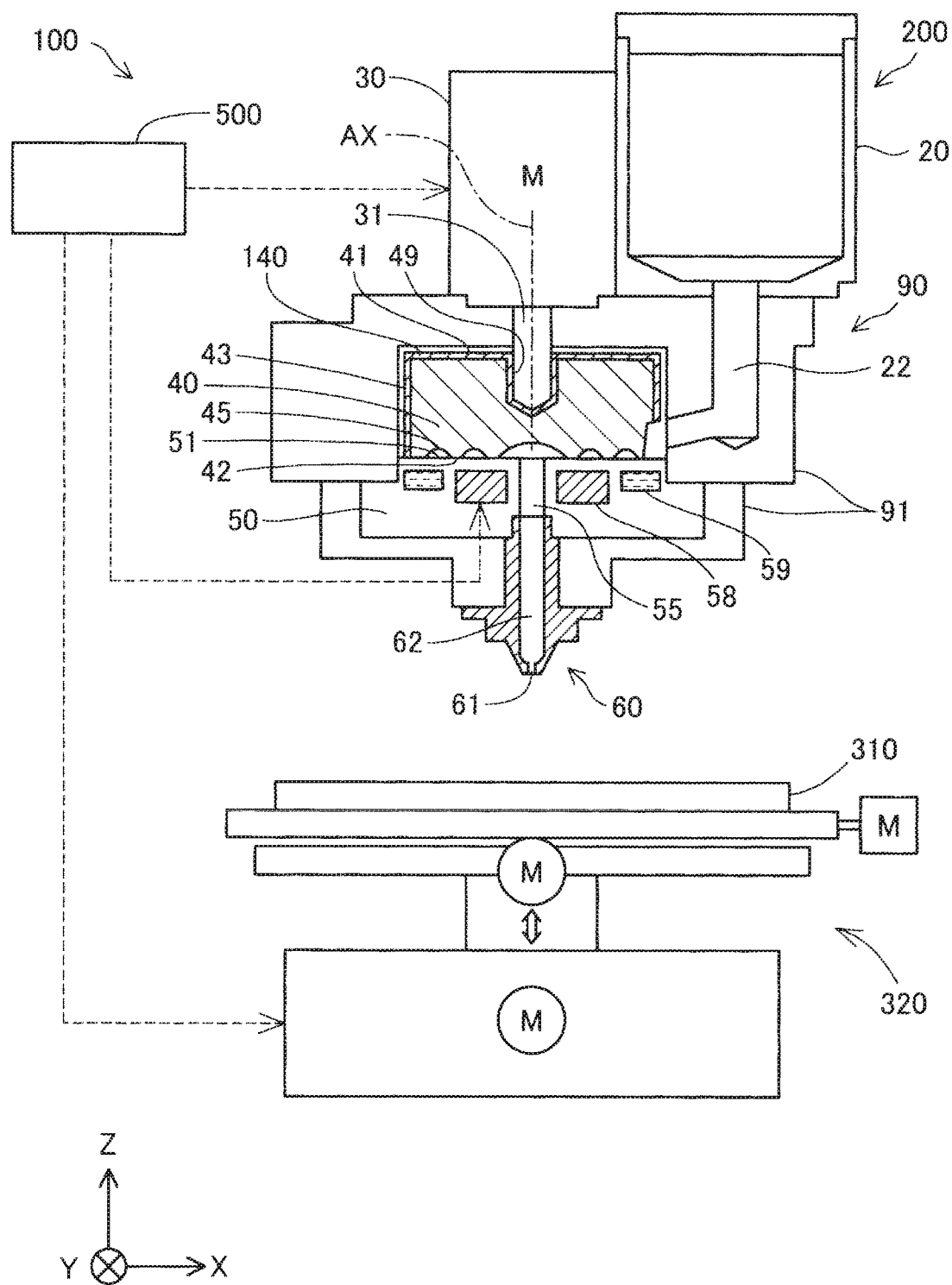
FIG. 1 is an explanatory view showing a schematic configuration of a three-dimensional modeling device in a first embodiment.

FIG. 1 is an explanatory view showing a schematic configuration of a three-dimensional modeling device 100 in a first embodiment. In FIG. 1, arrows along X, Y, and Z directions that are orthogonal to each other are shown. The X direction and the Y direction are directions along the horizontal direction, and the Z direction is a direction along the vertical direction. In other views as well, arrows along X, Y, and Z directions are appropriately shown. The X, Y, and Z directions in FIG. 1 and X, Y, and Z directions in other views respectively indicate the same direction.

The three-dimensional modeling device 100 in the present embodiment includes an ejection unit 200 having a material supply portion 20, a plasticizing device 90, and a nozzle 60, a modeling table 310, a movement mechanism 320, and a control portion 500. In the three-dimensional modeling device 100 in the present embodiment, a material supplied from the material supply portion 20 is plasticized by the plasticizing device 90 under the control of the control portion 500. The material plasticized by the plasticizing device 90 is sent out from the plasticizing device 90 as a modeling material and supplied to the nozzle 60. The modeling material supplied to the nozzle 60 is ejected toward the modeling table 310 from a nozzle hole 61 provided at the front end portion of the nozzle 60. The modeling material ejected from the nozzle hole 61 is laminated on the modeling table 310, thereby modeling a three-dimensional modeled substance. Furthermore, the modeled material is also referred to as the molten material in some cases.

The movement mechanism 320 changes the relative locations of the modeling table 310 and the ejection unit 200. In the present embodiment, the movement mechanism 320 moves the modeling table 310 with respect to the ejection unit 200. The movement mechanism 320 in the present embodiment is configured of a triaxial positioner that moves the modeling table 310 in three-axis directions of the X, Y, and Z directions using a driving force of three motors. The respective motors are driven under the control of the control portion 500.

The movement mechanism 320 may have a configuration in which the modeling table 310 is not moved, but the ejection unit 200 is moved instead of the configuration in which the modeling table 310 is moved. In addition, the movement mechanism 320 may have a configuration in which both of the modeling table 310 and the ejection unit 200 are moved. The movement mechanism may have any configuration as long as the relative locations of the modeling table 310 and the ejection unit 200 can be changed.

The control portion 500 is configured of a computer including one or more processors, a main storage device, and an input and output interface that inputs and outputs signals from and to the outside. In the present embodiment, in the control portion 500, the processor executes a program or a command loaded onto the main storage device, thereby controlling the operation of the ejection unit 200 and the movement mechanism 320 to execute a modeling treatment that models a three-dimensional modeled substance. The operation includes the movement of the three-dimensional relative location of the ejection unit 200 with respect to the modeling table 310. Furthermore, the control portion 500 may be configured of a combination of a plurality of circuits instead of a computer.

A material in a state of pellets, powder, or the like is accommodated in the material supply portion 20. The material in the present embodiment is a pellet-form ABS resin. The material supply portion 20 in the present embodiment is configured of a hopper. The material accommodated in the material supply portion 20 is supplied to the plasticizing device 90 through a supply path 22 provided below the material supply portion 20.

The plasticizing device 90 includes a driving motor 30, a flat screw 40, a barrel 50, and a screw case 91. The plasticizing device 90 supplies a paste-form modeling material obtained by at least partially melting the solid-state material supplied from the material supply portion 20 to the nozzle 60. Furthermore, there will be a case where the flat screw 40 is simply referred to as the screw. There will be a case where the screw case 91 is simply referred to as the case.

The screw case 91 is a chassis that accommodates the flat screw 40 and the barrel 50. The driving motor 30 is fixed onto a top surface of the screw case 91. The rotary shaft 31 of the driving motor 30 is coupled to the flat screw 40. The driving motor 30 drives the flat screw 40 to be rotated under the control of the control portion 500.

The flat screw 40 is a substantially cylindrical screw having a height in a direction along a central axis AX that is smaller than the diameter. The flat screw 40 is disposed in the screw case 91 so that the central axis AX becomes parallel to the Z direction.

On a top surface 41 of the flat screw 40, a fixation hole 49 to which the rotary shaft 31 of the driving motor 30 is coupled is provided. The rotary shaft 31 of the driving motor 30 is screwed into the fixation hole 49, whereby the flat screw 40 and the rotary shaft 31 of the driving motor 30 are coupled to each other. The flat screw 40 rotates around the central axis AX in the screw case 91 due to a torque generated by the driving motor 30.

The flat screw 40 has a grooved surface 42 perpendicular to the central axis AX at an end portion opposite to the top surface 41 to which the driving motor 30 is coupled. On the grooved surface 42, a groove portion 45 is formed. Furthermore, a detailed shape of the groove portion 45 of the flat screw 40 will be described below using FIG. 2.

A part of the outer surface of the flat screw 40 in the present embodiment is covered with a heat conduction suppression portion 140. More specifically, the heat conduction suppression portion 140 is provided on all of the surfaces of the flat screw 40 in the fixation hole 49 and the top surface 41 and a side surface 43 of the flat screw 40 facing the screw case 91. In the present embodiment, the heat conduction suppression portion 140 is provided on the surfaces of the flat screw 40 in the fixation hole 49, and thus the rotary shaft 31 of the driving motor 30 is coupled to the flat screw 40 through the heat conduction suppression portion 140.

The heat conductivity of the heat conduction suppression portion 140 in the present embodiment is lower than the heat conductivity of the flat screw 40. In the present embodiment, the flat screw 40 is formed of stainless steel. In the present embodiment, the heat conduction suppression portion 140 is provided by forming a zirconia coating having a lower heat conductivity than stainless steel on the outer surface of the flat screw 40. The zirconia coating is formed by, for example, hot spraying. Furthermore, the flat screw 40 may be formed of, for example, a different metallic material such as a titanium alloy, a resin material, or a ceramic material. The heat conduction suppression portion 140 may be formed of a material other than zirconia as long as the material has a lower heat conductivity than the flat screw 40. The material of the flat screw 40 or the material of the heat conduction suppression portion 140 needs to be a material having heat resistance or hardness high enough to plasticize the material supplied from the material supply portion 20.

The barrel 50 is fixed below the flat screw 40 in the screw case 91. The barrel 50 has a screw facing surface 51 facing the grooved surface 42 of the flat screw 40. In the screw facing surface 51, a communication hole 55 that communicates with the nozzle hole 61 is provided at a location on the central axis AX of the flat screw 40. Furthermore, there will be a case where the screw facing surface 51 is simply referred to as the facing surface.

In the barrel 50, a heater 58 is built at a location facing the groove portion 45 of the flat screw 40. The temperature of the heater 58 is controlled by the control portion 500. In the present embodiment, a cooling water flow path 59 is provided on the outer circumferential side of the heater 58 in the barrel 50. A cooling water is circulated in the cooling water flow path 59 using a pump not shown so as to prevent the temperature of the barrel 50 from becoming too high. Furthermore, the cooling water flow path 59 may be provided near the barrel 50 in the screw case 91 instead of in the barrel 50. The cooling water flow path 59 may not be provided. Furthermore, a detailed shape of the barrel 50 will be described below using FIG. 3.

In the nozzle 60, a nozzle flow path 62 and the nozzle hole 61 are provided. To the nozzle flow path 62, the modeling material is supplied from the plasticizing device 90 through the communication hole 55. The nozzle hole 61 is a portion that is provided at an end portion of the nozzle flow path 62, which communicates with the atmosphere, and has a contracted flow path cross section. The modeling material supplied to the nozzle flow path 62 is ejected from the nozzle hole 61.

Figure 2:
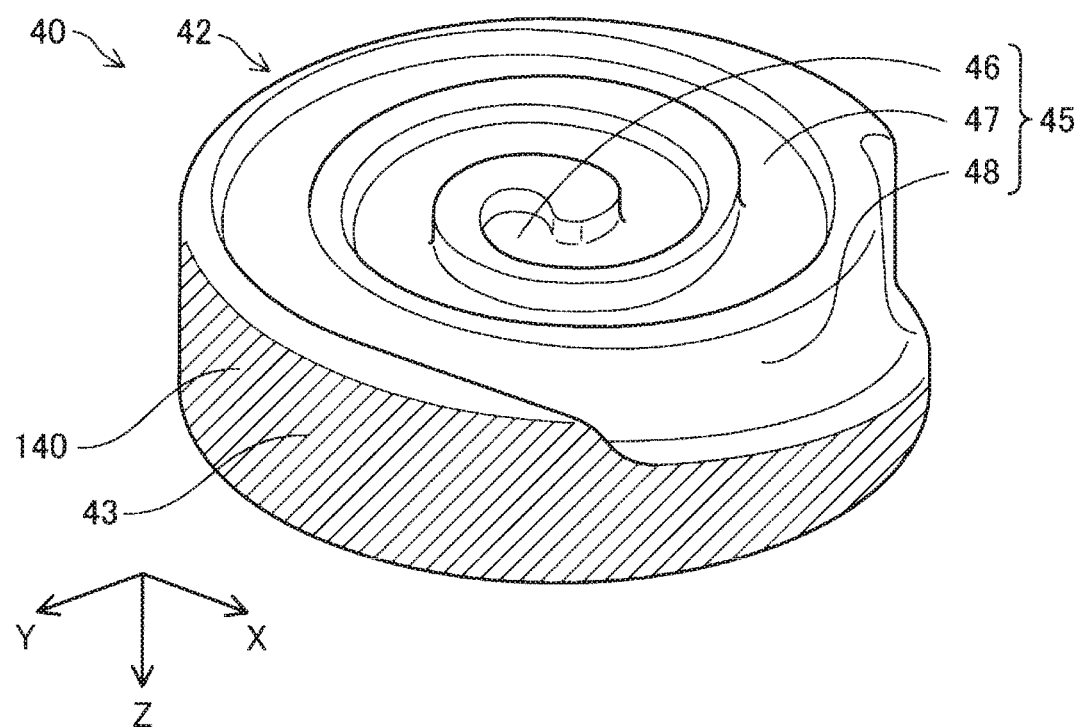
FIG. 2 is a perspective view showing a configuration of a grooved surface of a flat screw in the first embodiment.

FIG. 2 is a perspective view showing the configuration of the flat screw 40 in the first embodiment. The flat screw 40 shown in FIG. 2 is shown in a state in which the vertical locational relationship shown in FIG. 1 is reversed in order to facilitate the understanding of the technique. In FIG. 2, the heat conduction suppression portion 140 is hatched. In the present embodiment, on the grooved surface 42 of the flat screw 40, the groove portion 45 is formed. The groove portion 45 has a central portion 46, a spiral portion 47, and a material introduction portion 48. The central portion 46 is a circular hollow portion formed around the central axis AX of the flat screw 40. The central portion 46 faces the communication hole 55 provided in the barrel 50.

One end of the spiral portion 47 is coupled to the central portion 46. The spiral portion 47 extends from the central portion 46 as the center toward the outer circumference of the grooved surface 42 so as to draw an arc. The spiral portion 47 may be configured so as to extend in an involute curve shape or a spiral shape.

The other end of the spiral portion 47 is coupled to the material introduction portion 48. The material introduction portion 48 is a groove-like portion wider than the spiral portion 47 provided at an outer circumferential edge of the screw facing surface 51. The material introduction portion 48 continues up to the side surface 43 of the flat screw 40. The material supplied through the supply path 22 is introduced into the spiral portion 47 from the material introduction portion 48.

Figure 3:
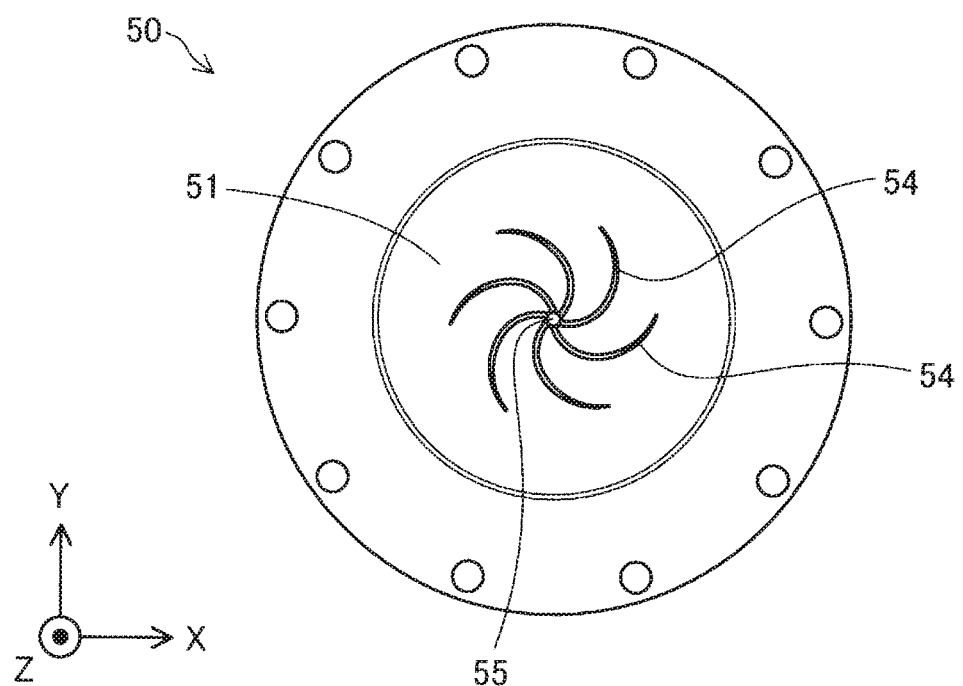
FIG. 3 is a top view showing a configuration of a screw facing surface of a barrel in the first embodiment.

FIG. 3 is a top view showing the configuration of the screw facing surface 51 of the barrel 50 in the first embodiment. As described above, the communication hole 55 that communicates with the nozzle 60 is formed in the center of the screw facing surface 51. A plurality of guide grooves 54 is formed around the communication hole 55 on the screw facing surface 51. The respective guide grooves 54 are coupled to the communication hole 55 at one end and extend in a spiral shape toward the outer circumference of the screw facing surface 51 from the communication hole 55. The respective guide grooves 54 has a function of guiding the modeling material to the communication hole 55.

According to the configuration of the above-described three-dimensional modeling device 100, when a modeling treatment that models a three-dimensional modeled substance is executed by the control portion 500, the material in the material supply portion 20 is supplied to the material introduction portion 48 from the side surface 43 of the rotating flat screw 40 through the supply path 22. The material supplied into the material introduction portion 48 is transported into the spiral portion 47 by the rotation of the flat screw 40. At least a part of the material transported into the spiral portion 47 is melted by the rotation of the flat screw 40 and heating by the heater 58 built in the barrel 50, thereby turning into a fluid paste-form modeling material.

The rotation of the flat screw 40 transports the modeling material toward the central portion 46 in the spiral portion 47, and the modeling material is sent out from the central portion 46 to the communication hole 55. The modeling material supplied to the nozzle 60 through the communication hole 55 is ejected toward the modeling table 310 from the nozzle hole 61. Furthermore, the flow amount of the modeling material being ejected from the nozzle hole 61 is referred to as the ejection amount.

When the temperature of the flat screw 40 becomes too high, it becomes difficult to transport the modeling material in the spiral portion 47, and thus the flow amount of the modeling material being sent out from the communication hole 55 decreases, and the ejection amount of the modeling material from the nozzle hole 61 decreases. Therefore, the temperature of the flat screw 40 is preferably maintained at a temperature suitable for the melting and transportation of the modeling material in the spiral portion 47.

According to the three-dimensional modeling device 100 of the present embodiment described above, the rotary shaft 31 of the driving motor 30 and the flat screw 40 are coupled to each other through the heat conduction suppression portion 140, and thus it is possible to suppress the conduction of heat from the driving motor 30 to the flat screw 40 through the rotary shaft 31. Therefore, it is possible to suppress the temperature of the flat screw 40 becoming too high. Therefore, it is possible to stabilize the flow amount of the modeling material being sent out from the communication hole 55, and it is possible to stabilize the ejection amount of the modeling material from the nozzle hole 61. Furthermore, in the present embodiment, all of the surfaces of the flat screw 40 in the fixation hole 49 are covered with the heat conduction suppression portion 140. In contrast, a part of the flat screw 40 may not be covered with the heat conduction suppression portion 140 and remain exposed as long as the conduction of heat of the driving motor 30 to the flat screw 40 through the rotary shaft 31 can be suppressed.

In addition, in the present embodiment, the heat conductivity of the heat conduction suppression portion 140 is smaller than the heat conductivity of the flat screw 40. Therefore, it is possible to more reliably suppress the conduction of heat from the driving motor 30 to the flat screw 40 through the rotary shaft 31 compared with an aspect in which the rotary shaft 31 of the driving motor 30 and the flat screw 40 are directly coupled to each other without the heat conduction suppression portion 140.

In addition, in the present embodiment, the heat conduction suppression portion 140 is provided on the surfaces of the flat screw 40 in the fixation hole 49. Therefore, it is possible to suppress the conduction of heat from the driving motor 30 to the flat screw 40 through the rotary shaft 31 using a simple configuration.

In addition, in the present embodiment, the heat conduction suppression portion 140 is provided on the top surface 41 and the side surface 43 of the flat screw 40 facing the screw case 91. Therefore, it is possible to suppress the conduction of heat from the screw case 91 to the flat screw 40, and thus it is possible to further suppress the temperature of the flat screw 40 becoming too high.

Furthermore, in the present embodiment, the pellet-form ABS resin is used as the material; however, as the material being used in the ejection unit 200, it is also possible to employ a material for modeling a three-dimensional modeled substance using, for example, a thermoplastic material or a variety of materials such as a metallic material and a ceramic material as a principal material. Here, the "principal material" refers to a material that serves as a key for configuring the shape of the three-dimensional modeled substance and refers to a material that has a content ratio of 50% by weight or more of the three-dimensional modeled substance. The modeling material described above includes a melt of the above-described principal material alone or a paste-form substance formed by the melting of a part of components that are contained together with the principal material.

In a case where a thermoplastic material is used as the principal material, a modeling material is generated by plasticizing the material in the plasticizing device 90. "Plasticizing" refers to the melting of a thermoplastic substance by applying heat thereto.

As the thermoplastic material, it is possible to use, for example, a thermoplastic resin material of any one or a combination of two or more of the following materials.
Examples of Thermoplastic Resin Material
General-purpose engineering plastics such as polypropylene resins (PP), polyethylene resins (PE), polyacetal resins (POM), polyvinyl chloride resins (PVC), polyamide resins (PA), acrylonitrile butadiene styrene resins (ABS), polylactic resins (PLA), polyphenylene sulfide resins (PPS), polyetheretherketone (PEEK), polycarbonate (PC), modified polyphenylene ether, polybutylene terephthalate, and polyethylene terephthalate and engineering plastics such as polysulfone, polyethersulfone, polyphenylene sulfide, polyarylate, polyimide, polyamide-imide, polyetherimide, and polyether ether ketone.

Into the thermoplastic material, a pigment, metal, and, ceramic, additionally, an additive such as wax, a flame retardant, an antioxidant, or a heat stabilizer, and the like may be mixed. In the plasticizing device 90, the thermoplastic material is plasticized and converted to a molten state by the rotation of the flat screw 40 and the heating by the heater 58. In addition, the modeling material generated as described above is ejected from the nozzle hole 61 and then cures due to the lowering of temperature.

The thermoplastic material is desirably injected from the nozzle hole 61 in a state of being fully melted by being heated to a glass transition temperature thereof or higher. For example, the glass transition temperature of the ABS resin is approximately 120° C., and the temperature of the ABS resin at the time of being sprayed from the nozzle hole 61 is desirably approximately 200° C. In order to spray the modeling material in a high-temperature state as described above, a heater may be provided around the nozzle hole 61.

In the ejection unit 200, instead of the above-described thermoplastic material, for example, the following metallic materials may also be used as a main material. In this case, it is desirable to mix a component that is melted at the time of generating the modeling material with a powder-form material formed by powdering the following metallic material and inject the mixture to the plasticizing device 90.
Examples of Metallic Material
Pure metal such as magnesium (Mg), iron (Fe), cobalt (Co), chromium (Cr), aluminum (Al), titanium (Ti), copper (Cu), or nickel (Ni) or alloys containing one or more thereof.
Examples of Alloy
Maraging steel, stainless steel, cobalt chromium molybdenum, a titanium alloy, a nickel alloy, an aluminum alloy, a cobalt alloy, and a cobalt chromium alloy.

In the ejection unit 200, it is possible to use a ceramic material instead of the above-described metallic material as a main material. As the ceramic material, for example, oxide ceramics such as silicon dioxide, titanium dioxide, aluminum oxide, and zirconium oxide, non-oxide ceramics such as aluminum nitride, and the like can be used. In a case where the above-described metallic material or ceramic material is used as the principal material, the modeling material disposed on the modeling table 310 may also be cured by sintering by, for example, radiation using a laser, hot air, or the like.

The powder-form material of the metallic material or the ceramic material that is injected into the material supply portion 20 may be a mixed material obtained by mixing a plurality of kinds of powders of pure metals, powders of alloys, or powder of ceramic materials. In addition, the powder-form material of the metallic material or the ceramic material may be coated with, for example, a thermoplastic resin as exemplified above or a thermoplastic resin that is not exemplified above. In this case, the thermoplastic resin may melt and develop fluidity in the plasticizing device 90.

To the powder-form material of the metallic material or the ceramic material that is injected into the material supply portion 20, it is possible to add, for example, a solvent as described below. As the solvent, it is possible to use one or more in combination selected from the following.
Examples of Solvent
Water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkyl ammonium acetates; sulfoxide-based solvents such as dimethyl sulfoxide and diethyl sulfoxide; pyridine-based solvents such as pyridine, γ-picoline, and 2,6-lutidine; tetraalkylammonium acetates (for example, tetrabutylammonium acetate and the like); ionic liquids such as butyl carbitol acetate; and the like.

Additionally, to the powder-form material of the metallic material or the ceramic material that is injected into the material supply portion 20, it is also possible to add, for example, a binder as described below.
Examples of Binder
An acrylic resin, an epoxy resin, a silicone resin, a cellulose-based resin, other synthetic resins, polylactic acid (PLA), polyamide (PA), polyphenylene sulfide (PPS), polyether ether ketone (PEEK), or other thermoplastic resins.

B. Second Embodiment

Figure 4:
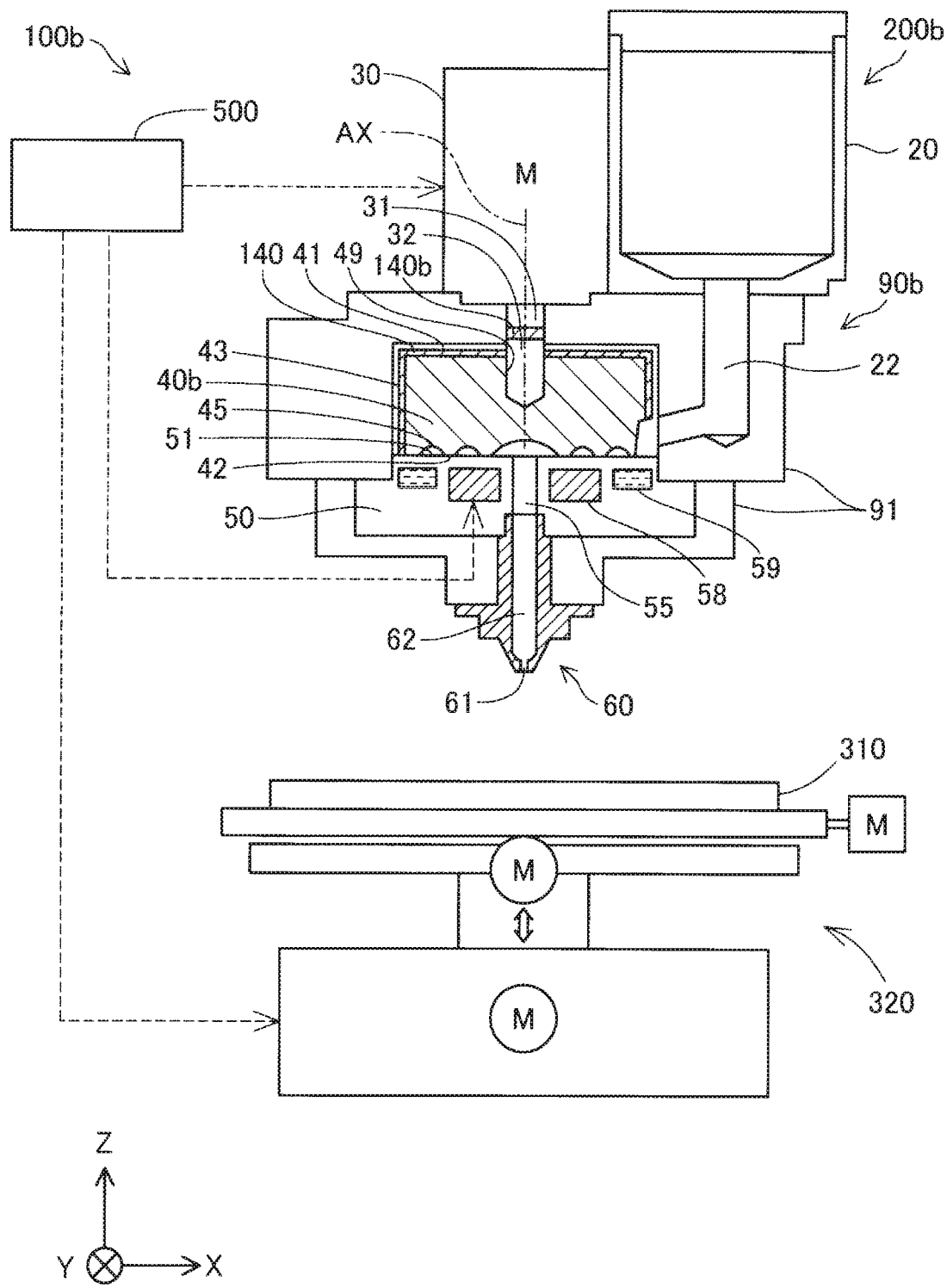
FIG. 4 is an explanatory view showing a schematic configuration of a three-dimensional modeling device in a second embodiment.

FIG. 4 is an explanatory view showing the schematic configuration of a three-dimensional modeling device 100*b* in a second embodiment. In the three-dimensional modeling device 100b of the second embodiment, the disposition of the heat conduction suppression portions 140 and 140b in a plasticizing device 90b in an ejection unit 200b is different from that in the first embodiment. In addition, the fact that the rotary shaft 31 of the driving motor 30 is coupled to a flat screw 40b through a coupling portion 32 is different from the first embodiment. Unless particularly otherwise described, other configurations are the same as in the first embodiment shown in FIG. 1.

The coupling portion 32 is a shaft-like member provided on the front end side of the rotary shaft 31 of the driving motor 30. A torque generated by the driving motor 30 is transmitted to the flat screw 40b from the rotary shaft 31 through the coupling portion 32.

In the present embodiment, the heat conduction suppression portion 140b is not provided on the surfaces of the flat screw 40b in the fixation hole 49, but is provided between the rotary shaft 31 of the driving motor 30 and the coupling portion 32. That is, the rotary shaft 31 of the driving motor 30 is coupled to the flat screw 40b through the heat conduction suppression portion 140b and the coupling portion 32. The heat conductivity of the heat conduction suppression portion 140b in the present embodiment is smaller than the heat conductivity of the rotary shaft 31 of the driving motor 30. Furthermore, the fact that the heat conduction suppression portion 140 is provided on the top surface 41 and the side surface 43 of the flat screw 40b facing the screw case 91 is the same as in the first embodiment.

Figure 5:
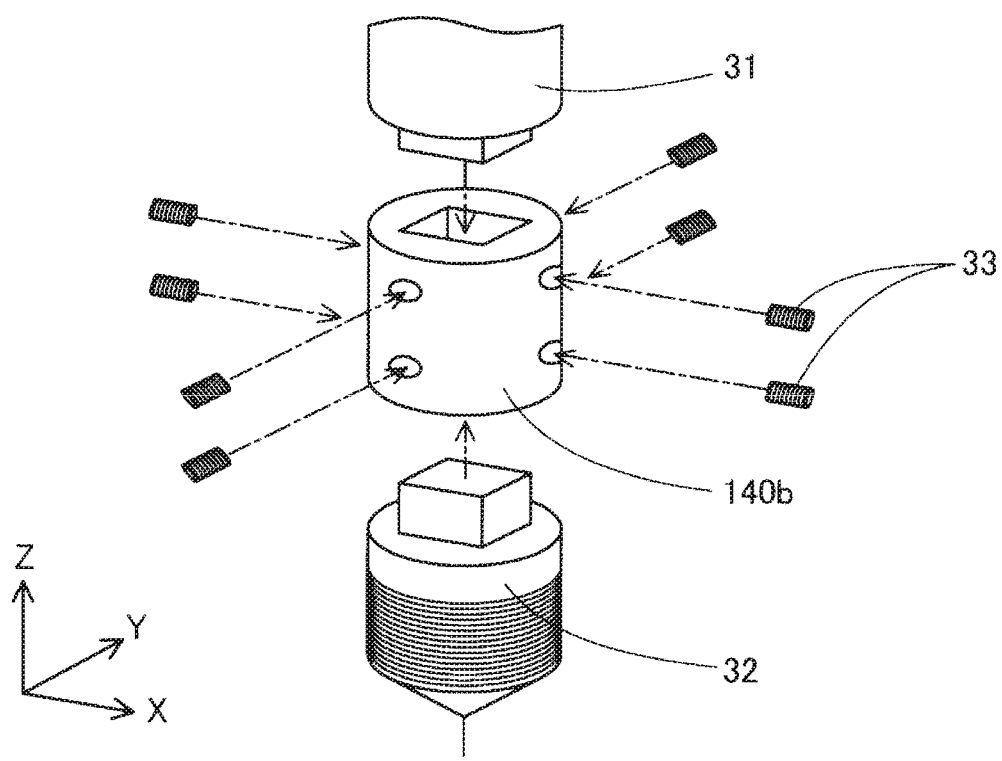
FIG. 5 is an explanatory view showing a configuration of a heat conduction suppression portion in the second embodiment.

FIG. 5 is an explanatory view showing the configuration of the heat conduction suppression portion 140b in the present embodiment. In the present embodiment, the rotary shaft 31 of the driving motor 30, the heat conduction suppression portion 140b, and the coupling portion 32 are mechanically joined together. In the present embodiment, square holes are formed at the top end and the bottom end of the heat conduction suppression portion 140b. The bottom end of the rotary shaft 31 and the top end of the coupling portion 32 are formed in a square column shape. The bottom end of the rotary shaft 31 is fitted into the square hole at the top end of the heat conduction suppression portion 140b, and the heat conduction suppression portion 140b and the rotary shaft 31 are fixed thereto using screws 33. The top end of the coupling portion 32 is fitted into the square hole at the bottom end of the heat conduction suppression portion 140b, and the heat conduction suppression portion 140b and the coupling portion are fixed thereto using screws 33. That is, in the present embodiment, the heat conduction suppression portion 140b has a function as a shaft coupling. Furthermore, the rotary shaft 31 of the driving motor 30, the heat conduction suppression portion 140b, and the coupling portion 32 may also be joined together in a configuration other than the above-described configuration as long as the rotary shaft of the driving motor, the heat conduction suppression portion, and the coupling portion are joined together so as to be capable of transmitting the torque generated by the driving motor 30 to the flat screw 40b.

According to the three-dimensional modeling device 100b of the present embodiment described above, the rotary shaft 31 of the driving motor 30 is coupled to the flat screw 40b through the heat conduction suppression portion 140b and the coupling portion 32, and thus it is possible to suppress the conduction of heat of the driving motor 30 to the flat screw 40b. Therefore, it is possible to suppress the temperature of the flat screw 40b becoming too high.

C. Third Embodiment

Figure 6:
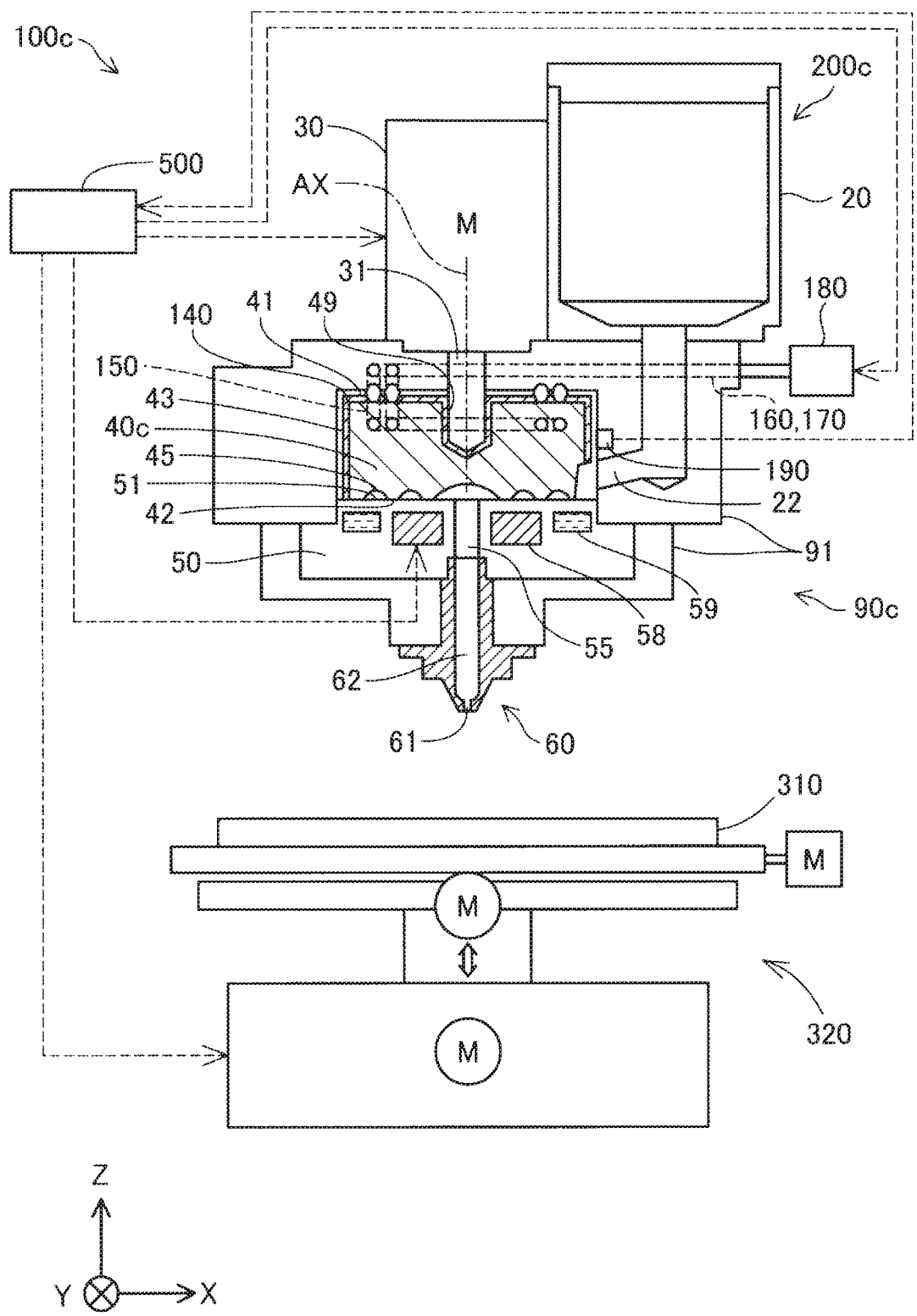
FIG. 6 is an explanatory view showing a schematic configuration of a three-dimensional modeling device in a third embodiment.

FIG. 6 is an explanatory view showing the schematic configuration of a three-dimensional modeling device 100c of a third embodiment. In the three-dimensional modeling device 100c of the third embodiment, the fact that, in a plasticizing device 90c in an ejection unit 200c, a screw cooling medium flow path 150 is provided in a flat screw 40c and a cooling medium supply flow path 160 and a cooling medium discharge flow path 170 are provided in the screw case 91 is different from the first embodiment. In addition, the fact that the three-dimensional modeling device 100c includes a cooling medium pump 180 that supplies a cooling medium to the screw cooling medium flow path 150 and a temperature sensor 190 that acquires the temperature of the flat screw 40c is different from the first embodiment. Unless particularly otherwise described, other configurations are the same as in the first embodiment shown in FIG. 1. Furthermore, the screw cooling medium flow path 150 is also simply referred to as the cooling medium flow path.

In the screw cooling medium flow path 150, a cooling medium for cooling the flat screw 40c flows. As the cooling medium, it is possible to use, for example, water, oil, or a coolant. In the cooling medium supply flow path 160, the cooling medium supplied to the screw cooling medium flow path 150 flows. In the cooling medium discharge flow path 170, the cooling medium discharged from the screw cooling medium flow path 150 flows.

The cooling medium pump 180 is coupled to the cooling medium supply flow path 160 and the cooling medium discharge flow path 170. The cooling medium pump 180 is driven under the control of the control portion 500 and circulates the cooling medium from the cooling medium discharge flow path 170 to the cooling medium supply flow path 160.

The temperature sensor 190 measures the temperature of the flat screw 40c. Information regarding the measured temperature of the flat screw 40c is sent to the control portion 500. As the temperature sensor 190, it is possible to use, for example, a non-contact-type sensor such as a radiation thermometer. Furthermore, the temperature sensor 190 may be a contact-type sensor such as a thermocouple attached to the flat screw 40c.

Figure 7:
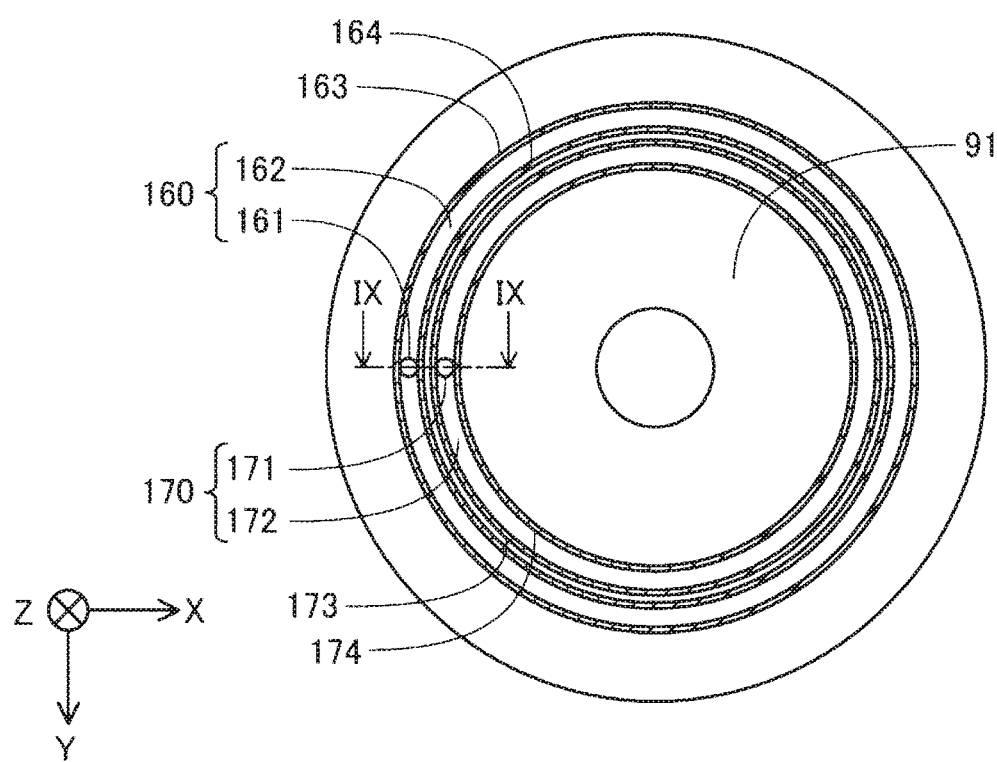
FIG. 7 is an explanatory view showing a configuration of a cooling medium supply flow path and a cooling medium discharge flow path in the third embodiment.

FIG. 7 is an explanatory view showing the configuration of the cooling medium supply flow path 160 and the cooling medium discharge flow path 170 in the present embodiment. The cooling medium supply flow path 160 has a cooling medium supply pipe 161 and a case supply groove portion 162. The case supply groove portion 162 is a toric groove provided on an inner wall surface of the screw case 91 which faces the top surface 41 of the flat screw 40c. The center of the torus of the case supply groove portion 162 is located on the central axis AX of the flat screw 40c. The case supply groove portion 162 communicates with the cooling medium pump 180 through the cooling medium supply pipe 161.

The cooling medium discharge flow path 170 has a cooling medium discharge pipe 171 and a case discharge groove portion 172. The case discharge groove portion 172 is a toric groove provided on an inner wall surface of the screw case 91 which faces the top surface 41 of the flat screw 40c. The case discharge groove portion 172 is disposed inside the case supply groove portion 162 parallel to the case supply groove portion 162. The center of the torus of the case discharge groove portion 172 is located on the central axis AX of the flat screw 40c. The case discharge groove portion 172 communicates with the cooling medium pump 180 through the cooling medium discharge pipe 171. Furthermore, the case supply groove portion 162 and the case discharge groove portion 172 are referred to as the case groove portion without being particularly differentiated from each other.

In the screw case 91, an outer circumferential supply seal member 163 is provided along the outer circumferential edge of the case supply groove portion 162, and an inner circumferential supply seal member 164 is provided along the inner circumferential edge of the case supply groove portion 162. In the screw case 91, an outer circumferential discharge seal member 173 is provided along the outer circumferential edge of the case discharge groove portion 172, and an inner circumferential discharge seal member 174 is provided along the inner circumferential edge of the case discharge groove portion 172. For the outer circumferential supply seal member 163, the inner circumferential supply seal member 164, the outer circumferential discharge seal member 173, and the inner circumferential discharge seal member 174, a highly elastic metallic material can be used.

Figure 8:
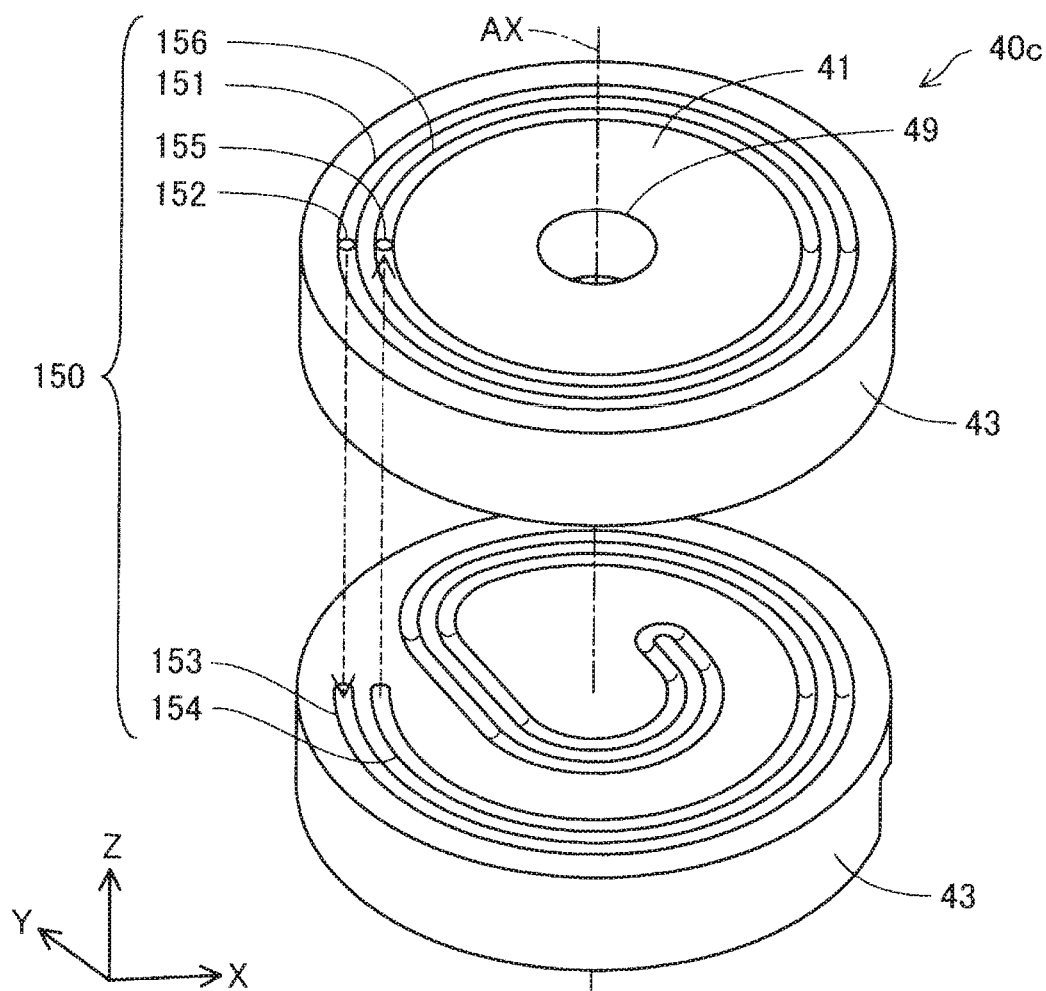
FIG. 8 is an explanatory view showing a configuration of a screw cooling medium flow path in the third embodiment.

FIG. 8 is an explanatory view showing the configuration of the screw cooling medium flow path 150 in the present embodiment. In FIG. 8, the flat screw 40c is shown in a state of being divided into an upper portion and a lower portion in order to facilitate the understanding of the technique. The screw cooling medium flow path 150 has a screw supply groove portion 151, an inlet portion 152, an upstream circulation portion 153, a downstream circulation portion 154, an outlet portion 155, and a screw discharge groove portion 156, and the cooling medium flows through the portions in the above-described order. Furthermore, the screw supply groove portion 151 and the screw discharge groove portion 156 are referred to as the screw groove portion without being particularly differentiated from each other.

The screw supply groove portion 151 is a toric groove provided on the top surface 41 of the flat screw 40c. The screw supply groove portion 151 is provided at a location facing the case supply groove portion 162. The center of the torus of the screw supply groove portion 151 is, similar to the center of the torus of the above-described case supply groove portion 162, located on the central axis AX of the flat screw 40c. The diameter of the screw supply groove portion 151 and the diameter of the case supply groove portion 162 are the same as each other. Therefore, even during the rotation of the flat screw 40c, a state in which the screw supply groove portion 151 and the case supply groove portion 162 face each other is ensured. To the screw supply groove portion 151, the cooling medium is supplied from the cooling medium supply flow path 160. In the screw supply groove portion 151, the inlet portion 152 that communicates with the upstream circulation portion 153 is provided. The cooling medium supplied from the cooling medium supply flow path 160 is introduced into the upstream circulation portion 153 through the inlet portion 152.

The screw discharge groove portion 156 is a toric groove provided on the top surface 41 of the flat screw 40c. The screw discharge groove portion 156 is provided at a location facing the case discharge groove portion 172. The center of the torus of the screw discharge groove portion 156 is, similar to the center of the torus of the above-described case discharge groove portion 172, located on the central axis AX of the flat screw 40c. The diameter of the screw discharge groove portion 156 and the diameter of the case discharge groove portion 172 are the same as each other. Therefore, even during the rotation of the flat screw 40c, a state in which the screw discharge groove portion 156 and the case discharge groove portion 172 face each other is ensured. In the screw discharge groove portion 156, the outlet portion 155 that communicates with the downstream circulation portion 154 is provided. The cooling medium flowing in the downstream circulation portion 154 is discharged to the cooling medium discharge flow path 170 through the outlet portion 155. In the present embodiment, the screw discharge groove portion 156 is disposed inside the screw supply groove portion 151 parallel to the screw supply groove portion 151. That is, the outlet portion 155 is provided closer to the central side of the flat screw 40c than the inlet portion 152.

The upstream circulation portion 153 is provided inside the flat screw 40c. In the present embodiment, the upstream circulation portion 153 extends in a spiral shape along the circumferential direction of the flat screw 40c from the outer circumferential side toward the central side of the flat screw 40c. One end portion of the upstream circulation portion 153 communicates with the inlet portion 152. The other end portion of the upstream circulation portion 153 communicates with the downstream circulation portion 154.

The downstream circulation portion 154 is provided inside the flat screw 40c. In the present embodiment, the downstream circulation portion 154 is disposed along the inner circumference of the upstream circulation portion 153. The downstream circulation portion 154 extends in a spiral shape along the circumferential direction of the flat screw 40c from the central side toward the outer circumferential side of the flat screw 40c. One end portion of the downstream circulation portion 154 communicates with the upstream circulation portion 153. The other end portion of the downstream circulation portion 154 communicates with the outlet portion 155.

The flat screw 40c in the present embodiment is formed by, for example, forming a groove or a hole in the flat screw in a state of being divided into an upper portion and a lower portion as shown in FIG. 8 by cutting or the like and then joining the divided upper and lower portions together. The flat screw 40c in the present embodiment may also be formed by lamination using a three-dimensional modeling device.

Figure 9:
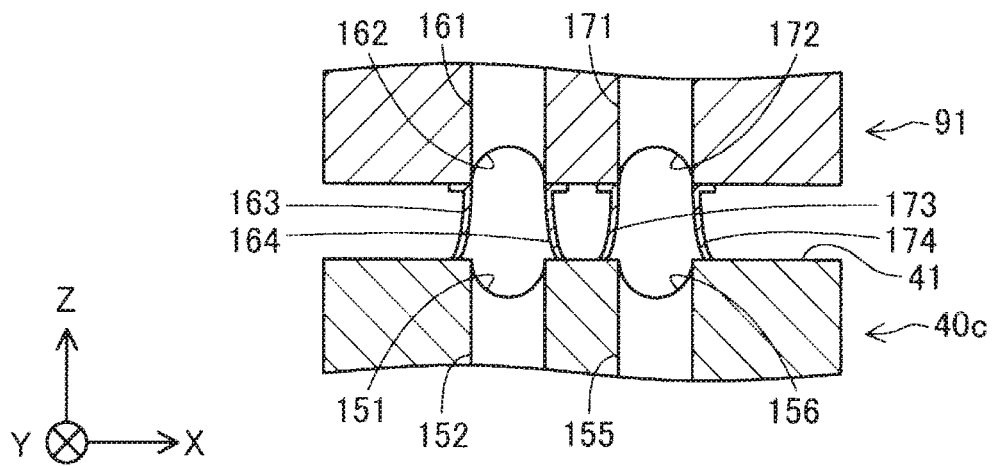
FIG. 9 is a cross-sectional view of a screw case in the third embodiment in a direction of a IX-IX line.

FIG. 9 is a cross-sectional view of the screw case 91 in FIG. 7 in a direction of a IX-IX line. FIG. 9 shows a coupling portion between the cooling medium supply flow path 160 and the screw cooling medium flow path 150 and a coupling portion between the cooling medium discharge flow path 170 and the screw cooling medium flow path 150.

In the screw case 91, as described above, the outer circumferential supply seal member 163, the inner circumferential supply seal member 164, the outer circumferential discharge seal member 173, and the inner circumferential discharge seal member 174 are provided. One end portion of the outer circumferential supply seal member 163 and one end portion of the inner circumferential supply seal member 164 are fixed to the screw case 91. The other end portion of the outer circumferential supply seal member 163 and the other end portion of the inner circumferential supply seal member 164 are in contact with the top surface 41 of the flat screw 40c. A portion between the case supply groove portion 162 and the screw supply groove portion 151 is sealed by the outer circumferential supply seal member 163 and the inner circumferential supply seal member 164. The cooling medium is supplied to the screw supply groove portion 151 from the case supply groove portion 162 through a space surrounded by the case supply groove portion 162, the screw supply groove portion 151, the outer circumferential supply seal member 163, and the inner circumferential supply seal member 164.

One end portion of the outer circumferential discharge seal member 173 and one end portion of the inner circumferential discharge seal member 174 are fixed to the screw case 91. The other end portion of the outer circumferential discharge seal member 173 and the other end portion of the inner circumferential discharge seal member 174 are in contact with the top surface 41 of the flat screw 40c. A portion between the case discharge groove portion 172 and the screw discharge groove portion 156 is sealed by the outer circumferential discharge seal member 173 and the inner circumferential discharge seal member 174. The cooling medium is discharged from the screw discharge groove portion 156 to the case discharge groove portion 172 through a space surrounded by the case discharge groove portion 172, the screw discharge groove portion 156, the outer circumferential discharge seal member 173, and the inner circumferential discharge seal member 174.

Figure 10:
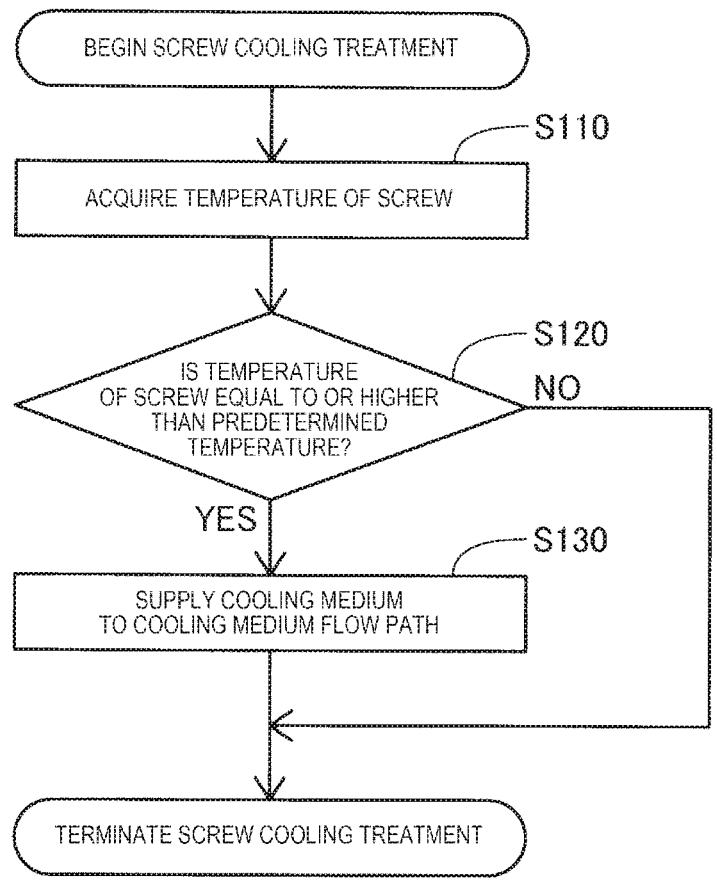
FIG. 10 is a flowchart showing contents of a screw cooling treatment in the third embodiment.

FIG. 10 is a flowchart showing the contents of a screw cooling treatment in the present embodiment. This treatment is repetitively executed by the control portion 500 during a period in which the driving motor 30 rotates the flat screw 40c. First, in Step S110, the control portion 500 acquires the temperature of the flat screw 40c using a temperature sensor 190. Next, in Step S120, the control portion 500 determines whether or not the temperature of the flat screw 40c is equal to or higher than a predetermined temperature. The predetermined temperature is set to a temperature at which there is a concern that the balance between the melting and the transportation of the modeling material in the spiral portion 47 may collapse when the cooling of the flat screw 40c begins. The temperature at which there is a concern that the balance between the melting and the transportation of the modeling material in the spiral portion 47 may collapse can be set by testing or simulation carried out in advance.

In a case where the temperature of the flat screw 40c is determined to be equal to or higher than the predetermined temperature, in Step S130, the control portion 500 drives the cooling medium pump 180, thereby supplying the cooling medium to the screw cooling medium flow path 150. After that, the control portion 500 terminates this treatment. On the other hand, when the temperature of the flat screw 40c is not determined to be equal to or higher than the predetermined temperature, the control portion 500 terminates this treatment without carrying out the treatment of Step S130. The control portion 500 repeats this treatment during the period in which the driving motor 30 rotates the flat screw 40c.

Furthermore, the control portion 500 may drive the cooling medium pump 180 at all times during the period in which the driving motor 30 rotates the flat screw 40c regardless of the above-described screw cooling treatment in the present embodiment. In this case, the three-dimensional modeling device 100c may not include the temperature sensor 190.

According to the above-described three-dimensional modeling device 100c of the present embodiment, the flat screw 40c can be cooled by circulating the cooling medium in the screw cooling medium flow path 150 provided in the flat screw 40c. Therefore, it is possible to suppress the temperature of the flat screw 40c becoming too high.

In addition, in the present embodiment, the outlet portion 155 is provided closer to the central side of the flat screw 40c than the inlet portion 152, and thus the cooling medium circulates in the flat screw 40c from the outer circumferential side toward the central side. Therefore, the outer circumferential side of the flat screw 40c is cooled more than the central side. The central side of the flat screw 40c preferably has a relatively low temperature in order for the plasticizing of the material. The outer circumferential side of the flat screw 40c preferably has a relatively low temperature in order for the transportation of the material. Therefore, the outer circumferential side of the flat screw 40c is cooled more than the central side, whereby it is possible to ensure an appropriate balance between the plasticizing and the transportation of the material.

In addition, in the present embodiment, even during the rotation of the flat screw 40c, it is possible to continuously supply the cooling medium from the case supply groove portion 162 to the screw supply groove portion 151 through the space surrounded by the case supply groove portion 162, the screw supply groove portion 151, the outer circumferential supply seal member 163, and the inner circumferential supply seal member 164. In addition, even during the rotation of the flat screw 40c, it is possible to continuously discharge the cooling medium from the screw discharge groove portion 156 to the case discharge groove portion 172 through the space surrounded by the case discharge groove portion 172, the screw discharge groove portion 156, the outer circumferential discharge seal member 173, and the inner circumferential discharge seal member 174.

In addition, in the present embodiment, the heat conduction suppression portion 140 is provided on both the top surface 41 and the side surface 43 of the flat screw 40c facing the screw case 91. Therefore, it is possible to suppress the conduction of heat to the flat screw 40c through the screw case 91, and thus it is possible to further suppress the temperature of the flat screw 40c becoming too high.

In addition, in the present embodiment, when the temperature of the flat screw 40c becomes equal to or higher than the predetermined temperature, the control portion 500 drives the cooling medium pump 180 to supply the cooling medium to the flat screw 40c. Therefore, it is possible to suppress the temperature of the flat screw 40c becoming too high and reduce power consumption during the period in which the flat screw 40c rotates more than a case where the cooling medium pump 180 is driven at all times.

D. Fourth Embodiment

Figure 11:
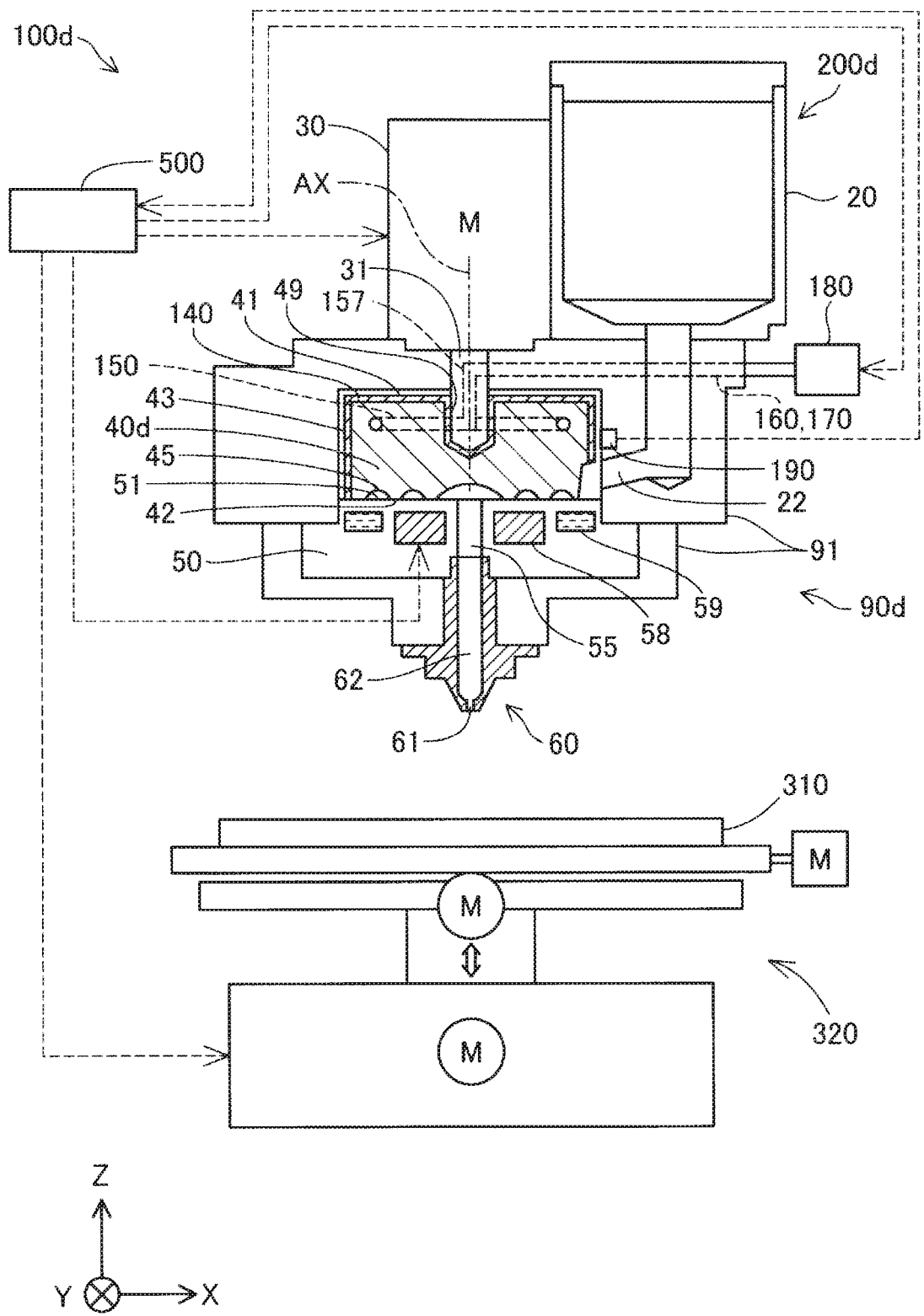
FIG. 11 is an explanatory view showing a schematic configuration of a three-dimensional modeling device in a fourth embodiment.

FIG. 11 is an explanatory view showing the schematic configuration of a three-dimensional modeling device 100d of a fourth embodiment. The three-dimensional modeling device 100d of the fourth embodiment is different from the third embodiment in terms of the fact that, in a plasticizing device 90d that an ejection unit 200d has, an in-shaft flow path 157 that communicates with the screw cooling medium flow path 150 is provided in the rotary shaft 31 of the driving motor 30. Unless particularly otherwise described, other configurations are the same as in the third embodiment shown in FIG. 6.

Figure 12:
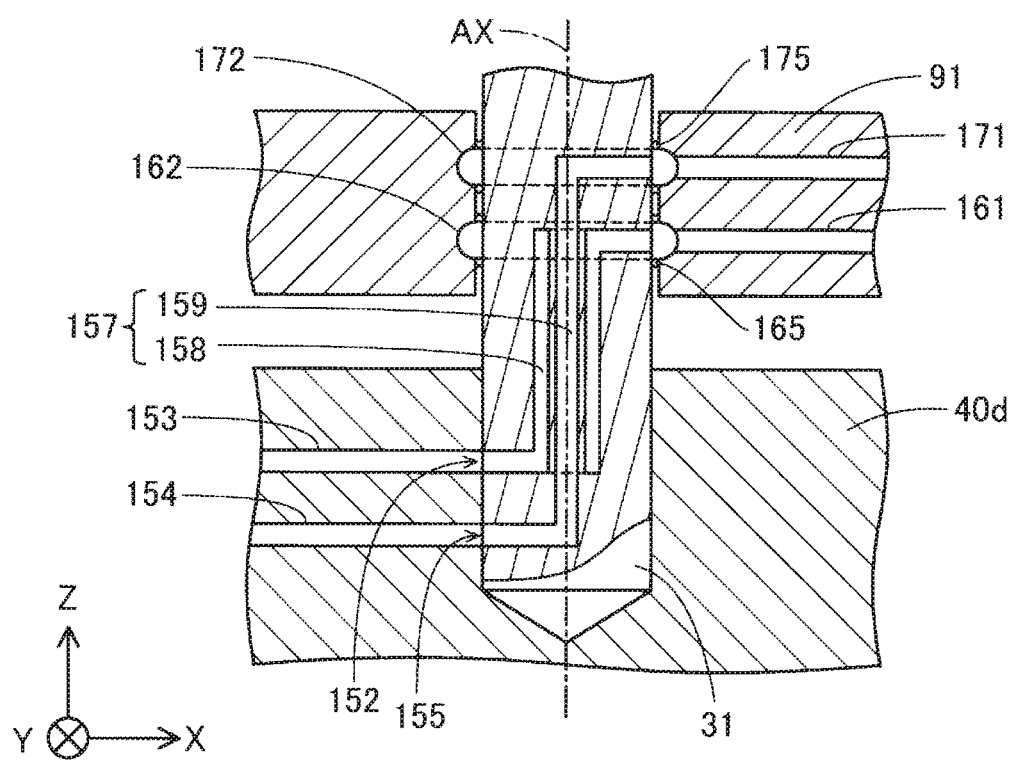
FIG. 12 is an explanatory view showing a detail of an in-shaft flow path in the fourth embodiment.

FIG. 12 is an explanatory view showing the detail of the in-shaft flow path 157. In the present embodiment, the in-shaft flow path 157 has a double-pipe structure. In the present embodiment, an outside layer of the in-shaft flow path 157 is an in-shaft supply flow path 158 for supplying the cooling medium to the screw cooling medium flow path 150. The in-shaft supply flow path 158 communicates with the case supply groove portion 162 at one end at which the in-shaft supply flow path is open to the side surface of the rotary shaft 31 of the driving motor 30 and communicates with the upstream circulation portion 153 of the screw cooling medium flow path 150 provided in a flat screw 40d at the other end.

In the present embodiment, the upstream circulation portion 153 extends the inside of the flat screw 40d toward the outer circumference. One end portion of the upstream circulation portion 153, as described above, communicates with the in-shaft supply flow path 158, and the other end portion of the upstream circulation portion 153 communicates with the downstream circulation portion 154. The downstream circulation portion 154 extends the inside of the flat screw 40d toward the central side from the outer circumferential side in a maze shape. One end portion of the downstream circulation portion 154, as described above, communicates with the upstream circulation portion 153, and the other end portion of the downstream circulation portion 154 communicates with an in-shaft discharge flow path 159 described below.

An inside layer of the in-shaft flow path 157 is the in-shaft discharge flow path 159 for discharging the cooling medium from the screw cooling medium flow path 150. The in-shaft discharge flow path 159 communicates with the case discharge groove portion 172 at one end at which the in-shaft discharge flow path is open to the side surface of the rotary shaft 31 and communicates with the downstream circulation portion 154 of the screw cooling medium flow path 150 provided in the flat screw 40d at the other end. Furthermore, the inside layer of the in-shaft flow path 157 may be the in-shaft supply flow path 158. In this case, the outside layer of the in-shaft flow path 157 needs to be the in-shaft discharge flow path 159.

In the present embodiment, the case supply groove portion 162 and the case discharge groove portion 172 are provided on a surface of the screw case 91 facing the rotary shaft 31 of the driving motor 30. The case supply groove portion 162 and the case discharge groove portion 172 are provided along the outer circumference of the rotary shaft 31 in an annular shape. The case supply groove portion 162 is provided below the case discharge groove portion 172. A portion between the case supply groove portion 162 and the rotary shaft 31 is sealed by a supply seal member 165. A portion between the case discharge groove portion 172 and the rotary shaft 31 is sealed by a discharge seal member 175.

According to the above-described three-dimensional modeling device 100d of the present embodiment, the cooling medium can be continuously supplied to the screw cooling medium flow path 150 provided in the flat screw 40d through the in-shaft flow path 157 even during the rotation of the flat screw 40d, and thus it is possible to cool the flat screw 40d. Therefore, it is possible to suppress the temperature of the flat screw 40d becoming too high.

In addition, in the present embodiment, it is possible to suppress the conduction of heat to the flat screw 40d through the rotary shaft 31 of the driving motor 30 by cooling the in-shaft flow path 157. Therefore, the in-shaft flow path 157 can also be regarded as the heat conduction suppression portion.

E. Fifth Embodiment

Figure 13:
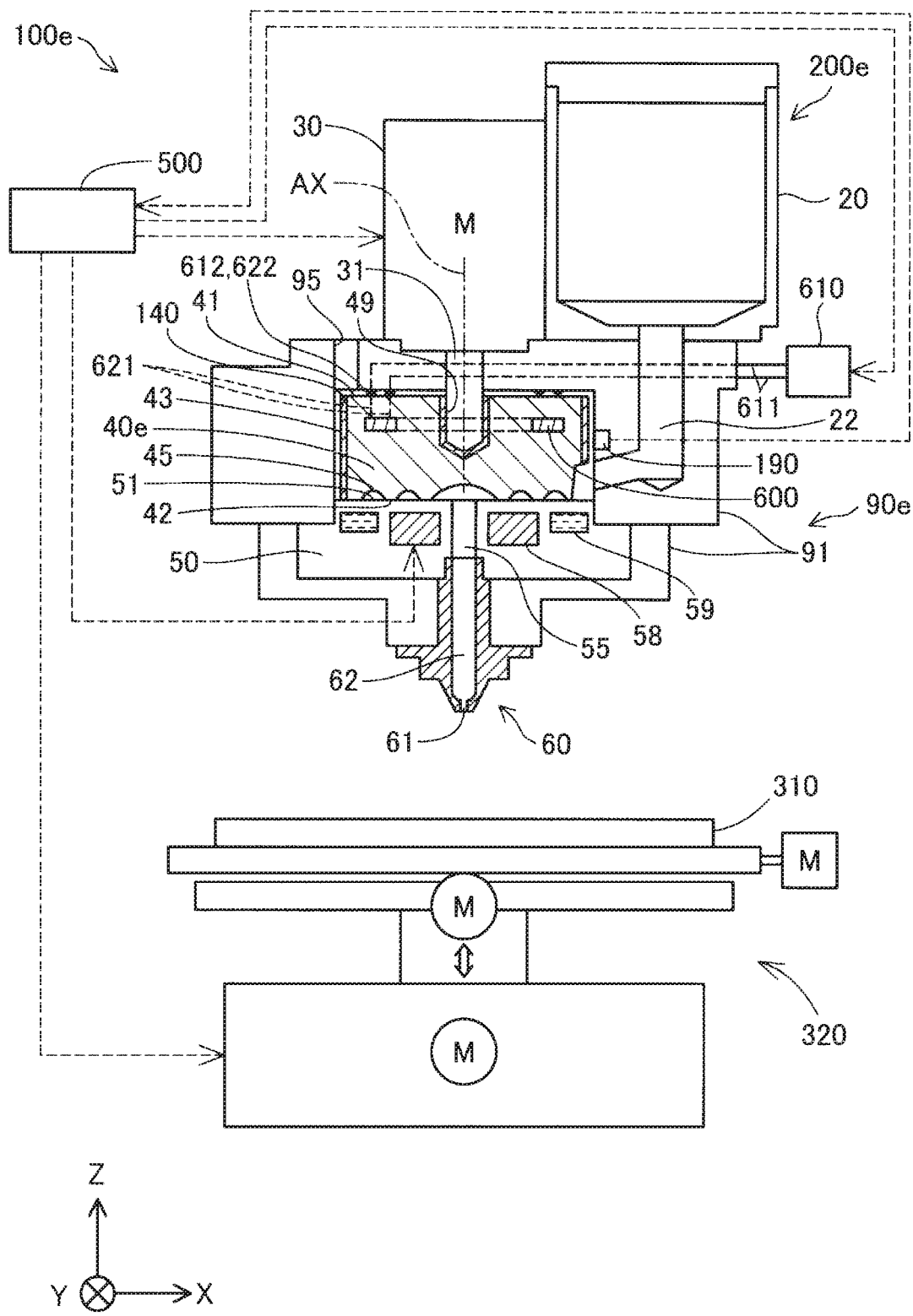
FIG. 13 is an explanatory view showing a schematic configuration of a three-dimensional modeling device in a fifth embodiment.

FIG. 13 is an explanatory view showing the schematic configuration of a three-dimensional modeling device 100e of a fifth embodiment. The three-dimensional modeling device 100e of the fifth embodiment is different from the first embodiment in terms of the fact that, in a plasticizing device 90e that an ejection unit 200e has, a Peltier device 600 is provided in a flat screw 40e. In addition, the three-dimensional modeling device 100e is different from the first embodiment in terms of the fact that the three-dimensional modeling device includes a power supply 610 that supplies electric currents to the Peltier device 600 and the temperature sensor 190 that acquires the temperature of the flat screw 40e. Unless particularly otherwise described, other configurations are the same as in the first embodiment shown in FIG. 1.

The Peltier device 600 is a thermoelectric element that absorbs heat on one surface and dissipates heat on the other surface by the Peltier effect. In the present embodiment, the Peltier device 600 is provided inside the flat screw 40e.

The power supply 610 supplies electric currents to the Peltier device 600 under the control of the control portion 500. Electric currents are supplied to the Peltier device 600 from the power supply 610 so that a bottom surface of the Peltier device 600 absorbs heat and a top surface of the Peltier device 600 dissipates heat. On an inner wall surface of the screw case 91 facing the top surface 41 of the flat screw 40e, a first contact 612 is provided. The first contact 612 and the power supply 610 are electrically coupled to each other through a first wire 611. On the top surface 41 of the flat screw 40e, a second contact 622 is provided so as to come into contact with the first contact 612. The second contact 622 and the Peltier device 600 are electrically coupled to each other through a second wire 621.

In the present embodiment, the heat conduction suppression portion 140 is not provided on the top surface of the flat screw 40e, and the heat conduction suppression portion 140 is provided on the side surface 43 of the flat screw 40e and the surfaces in the fixation hole 49.

In the present embodiment, an opening portion 95 that communicates with the atmosphere is provided in the screw case 91 above the flat screw 40e. Furthermore, the opening portion 95 may not be provided in the screw case 91.

The temperature sensor 190 measures the temperature of the flat screw 40e. Information regarding the measured temperature of the flat screw 40e is sent to the control portion 500. As the temperature sensor 190, it is possible to use, for example, a non-contact-type sensor such as a radiation thermometer. Furthermore, the temperature sensor 190 may be a contact-type sensor such as a thermocouple attached to the flat screw 40e.

Figure 14:
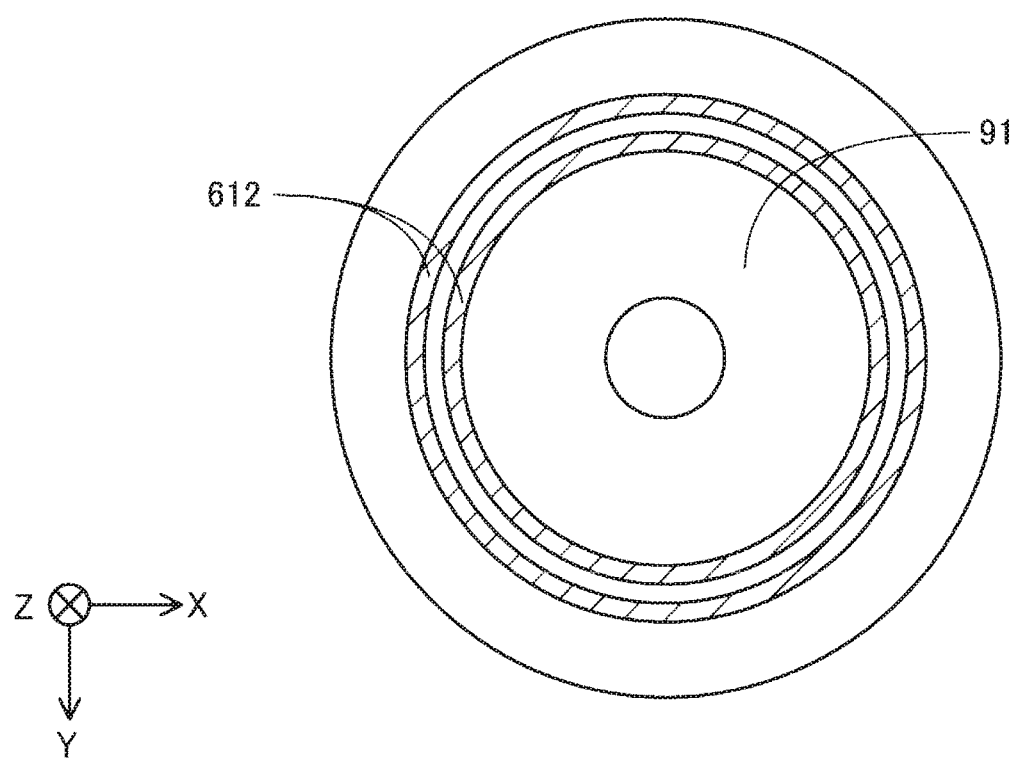
FIG. 14 is an explanatory view showing a configuration of a first contact in the fifth embodiment.

FIG. 14 is an explanatory view showing the configuration of the first contact 612 in the present embodiment. In the present embodiment, the first contact 612 is formed in a toric shape. The center of the first contact 612 is located on the central axis AX of the flat screw 40e. The radius of the first contact 612 is the same as the distance from the second contact 622 to the central axis AX of the flat screw 40e. Therefore, even during the rotation of the flat screw 40e, a state in which the first contact 612 and the second contact 622 are in contact with each other is ensured, and electric currents are supplied to the Peltier device 600 from the power supply 610. Furthermore, the first contact 612 may not be formed in a toric shape. Instead, it is necessary that at least any one of the first contact 612 and the second contact 622 is formed in a toric shape, and the first contact 612 and the second contact 622 are in contact with each other, whereby the first contact 612 and the second contact 622 are electrically coupled to each other.

Figure 15:
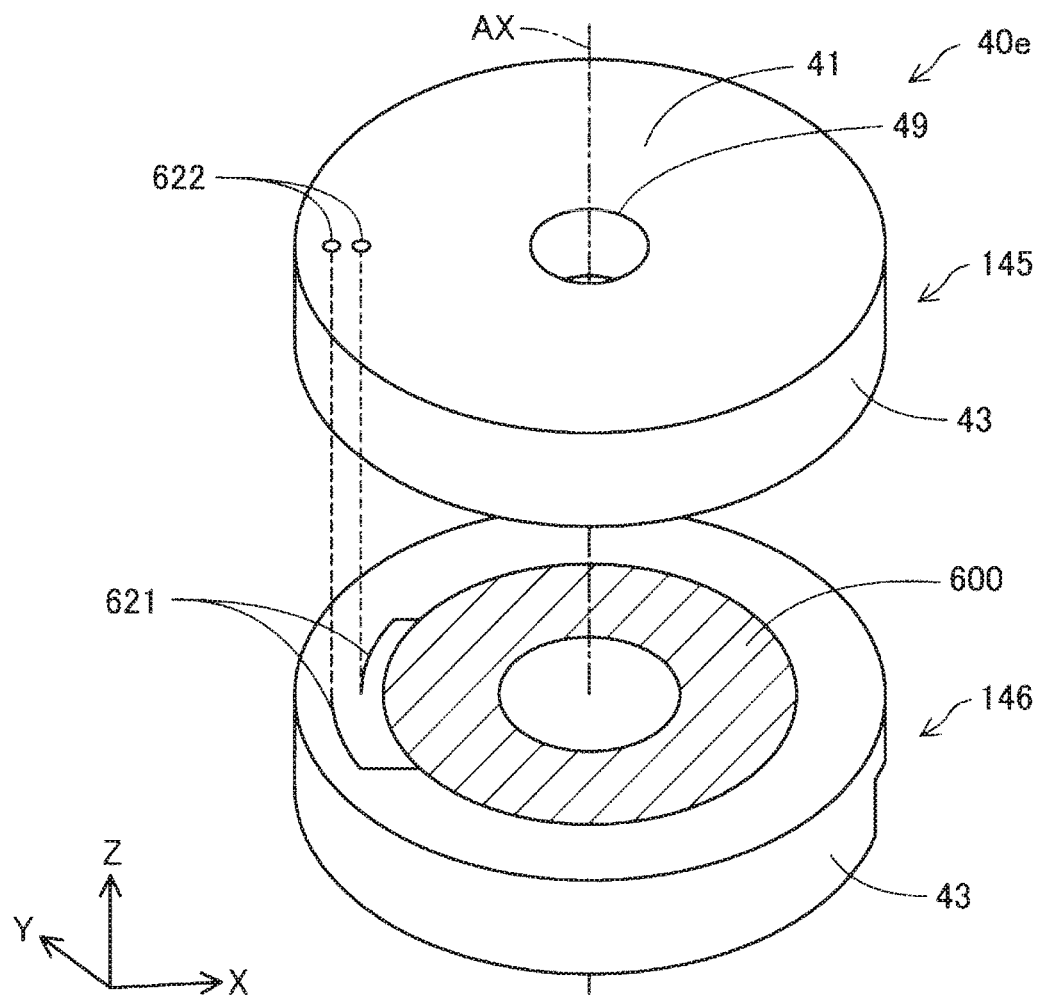
FIG. 15 is an explanatory view showing a configuration of a flat screw in the fifth embodiment.

FIG. 15 is an explanatory view showing the configuration of the flat screw 40e in the present embodiment. In the present embodiment, as described above, the Peltier device 600 is provided inside the flat screw 40e. The Peltier device 600 is disposed in a toric shape along the circumferential direction of the flat screw 40e. In the present embodiment, the flat screw 40e is configured of an upper side portion 145 having the top surface 41 and a lower side portion 146 having the grooved surface 42. The Peltier device 600 is provided between the upper side portion 145 and the lower side portion 146. The upper side portion 145 and the lower side portion 146 are joined together across the Peltier device 600. Furthermore, the Peltier device 600 may not be disposed in a toric shape along the circumferential direction of the flat screw 40e. The Peltier device 600 is disposed so as to capable of cooling the flat screw 40e.

In the present embodiment, the heat conductivity of the upper side portion 145 of the flat screw 40e is higher than the heat conductivity of the lower side portion 146 of the flat screw 40e. For the upper side portion 145, for example, beryllium copper, a titanium alloy, or the like can be used. For the lower side portion 146, for example, stainless steel, a titanium alloy, or the like can be used. Furthermore, the flat screw 40e may have a heat dissipation plate provided on the top surface of the Peltier device 600 instead of having the upper side portion 145 provided on the top surface of the Peltier device 600.

Figure 16:
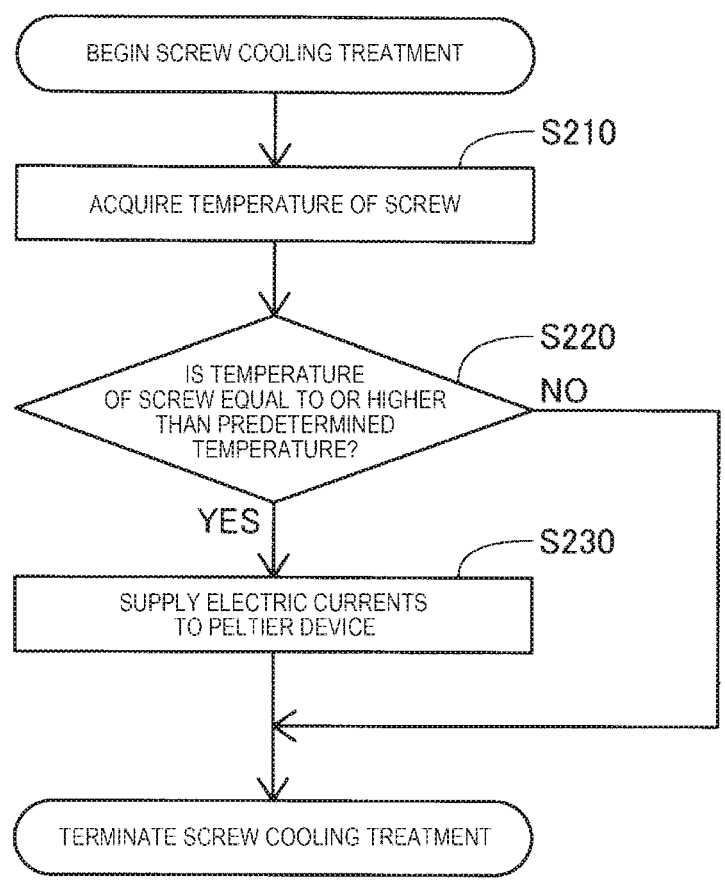
FIG. 16 is a flowchart showing contents of a screw cooling treatment in the fifth embodiment.

FIG. 16 is a flowchart showing the contents of a screw cooling treatment in the present embodiment. This treatment is repetitively executed by the control portion 500 during a period in which the driving motor 30 rotates the flat screw 40e. First, in Step S210, the control portion 500 acquires the temperature of the flat screw 40e using the temperature sensor 190. Next, in Step S220, the control portion 500 determines whether or not the temperature of the flat screw 40e is equal to or higher than a predetermined temperature. The predetermined temperature is set to a temperature at which there is a concern that the balance between the melting and the transportation of the modeling material in the spiral portion 47 may collapse when the cooling of the flat screw 40e begins. The temperature at which there is a concern that the balance between the melting and the transportation of the modeling material in the spiral portion 47 may collapse can be set by testing or simulation carried out in advance.

In a case where the temperature of the flat screw 40e is determined to be equal to or higher than the predetermined temperature, in Step S230, the control portion 500 supplies electric currents to the Peltier device 600 from the power supply 610. After that, the control portion 500 terminates this treatment. On the other hand, when the temperature of the flat screw 40e is not determined to be equal to or higher than the predetermined temperature, the control portion 500 terminates this treatment without carrying out the treatment of Step S230. The control portion 500 repeats this treatment during the period in which the driving motor 30 rotates the flat screw 40e.

Furthermore, the control portion 500 may supply electric currents to the Peltier device 600 from the power supply 610 at all times during the period in which the driving motor 30 rotates the flat screw 40e regardless of the above-described screw cooling treatment in the present embodiment. In this case, the three-dimensional modeling device 100e may not include the temperature sensor 190.

According to the above-described three-dimensional modeling device 100e of the present embodiment, the flat screw 40e can be cooled using the Peltier device 600, and thus it is possible to suppress the temperature of the flat screw 40e becoming too high.

In addition, in the present embodiment, the first contact 612 that is provided in the screw case 91 and formed in a toric shape and the second contact 622 provided in the flat screw 40e are in contact with each other, and thus the Peltier device 600 and the power supply 610 are electrically coupled to each other. Therefore, it is possible to supply electric currents to the Peltier device 600 from the power supply 610 provided outside the flat screw 40e even during the rotation of the flat screw 40e.

In addition, in the present embodiment, the opening portion 95 is provided in the screw case 91, and thus it is easy to discharge heat emitted from the Peltier device 600 to the outside of the screw case 91. Therefore, it is possible to improve an effect of the Peltier device 600 for cooling the flat screw 40e.

In addition, in the present embodiment, the Peltier device 600 is disposed in a toric shape around the central axis AX of the flat screw 40e, and thus it is possible to more effectively cool the outer circumferential side of the flat screw 40e than the central portion of the flat screw 40e. Therefore, it is possible to maintain an appropriate balance between the plasticizing and the transportation of the material.

In addition, in the present embodiment, the heat conduction suppression portion 140 is provided on the side surface 43 of the flat screw 40e. Therefore, it is possible to suppress the conduction of heat from the screw case 91 to the flat screw 40e, and thus it is possible to further suppress the temperature of the flat screw 40e becoming too high.

F. Sixth Embodiment

Figure 17:
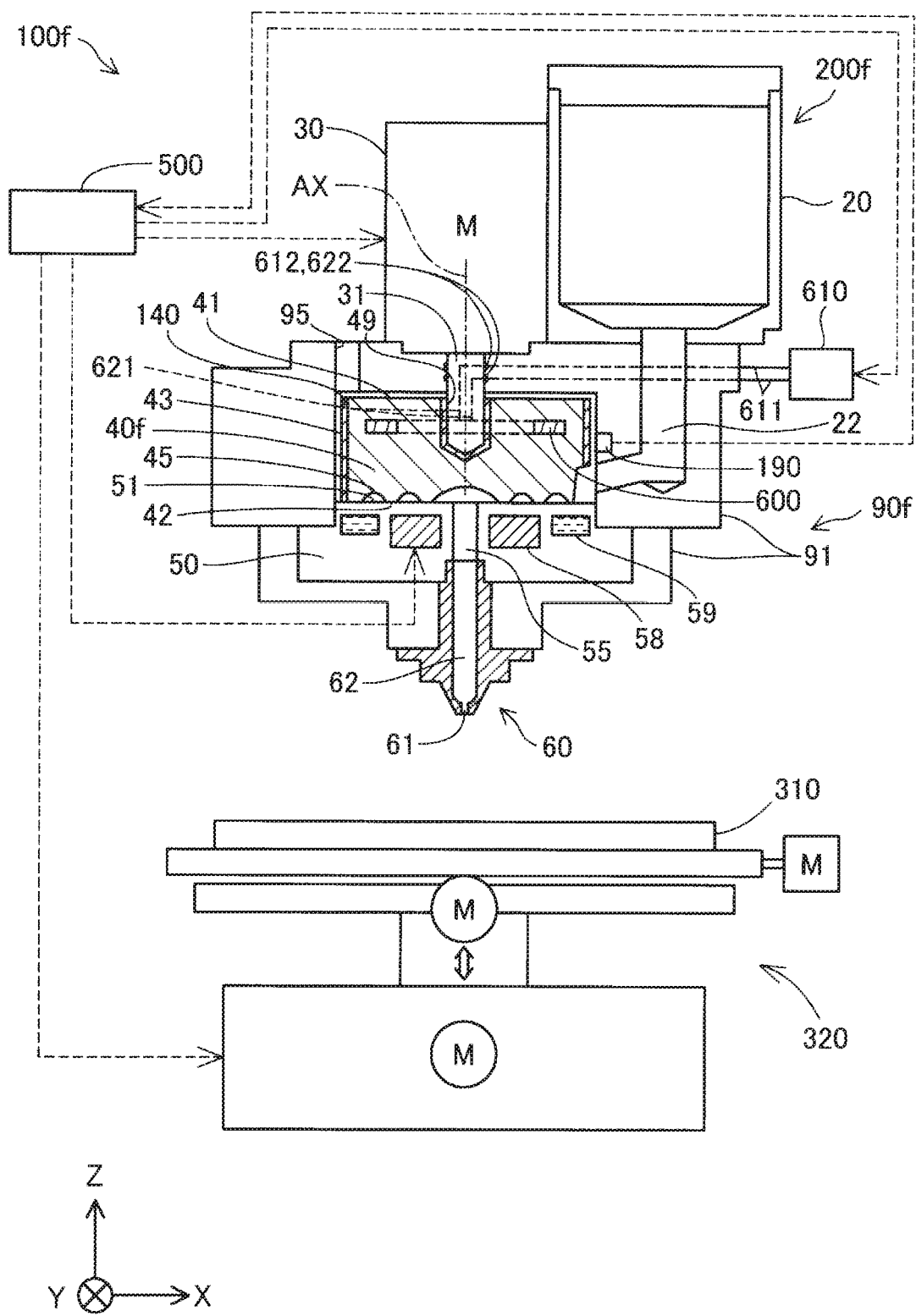
FIG. 17 is an explanatory view showing a schematic configuration of a three-dimensional modeling device in a sixth embodiment.

FIG. 17 is an explanatory view showing the schematic configuration of a three-dimensional modeling device 100f of a sixth embodiment. The three-dimensional modeling device 100f of the sixth embodiment is different from the fifth embodiment in terms of the fact that, in a plasticizing device 90f that an ejection unit 200f has, the second contact 622 is provided on the side surface of the rotary shaft 31 of the driving motor 30, and the second wire 621 passes through the inside of the rotary shaft 31 of the driving motor 30 and is coupled to the Peltier device 600. Unless particularly otherwise described, other configurations are the same as in the fifth embodiment shown in FIG. 13.

In the present embodiment, the first contact 612 is provided on a surface of the screw case 91 facing the rotary shaft 31 of the driving motor 30. The first contact 612 is formed along the outer circumference of the rotary shaft 31 of the driving motor 30 in a toric shape. Therefore, even during the rotation of a flat screw 40f, a state in which the first contact 612 and the second contact 622 are in contact with each other is ensured, and electric currents are supplied to the Peltier device 600 from the power supply 610.

According to the above-described three-dimensional modeling device 100f of the present embodiment, the second wire 621 for supplying electric currents to the Peltier device 600 passes through the inside of the rotary shaft 31 of the driving motor 30, and the first contact 612 that is provided in the screw case 91 and formed in a toric shape and the second contact 622 provided on the side surface of the rotary shaft 31 of the driving motor 30 are in contact with each other, and thus the Peltier device 600 and the power supply 610 are electrically coupled to each other. Therefore, it is possible to supply electric currents to the Peltier device 600 from the power supply 610 provided outside the flat screw 40f even during the rotation of the flat screw 40f.

G. Seventh Embodiment

Figure 18:
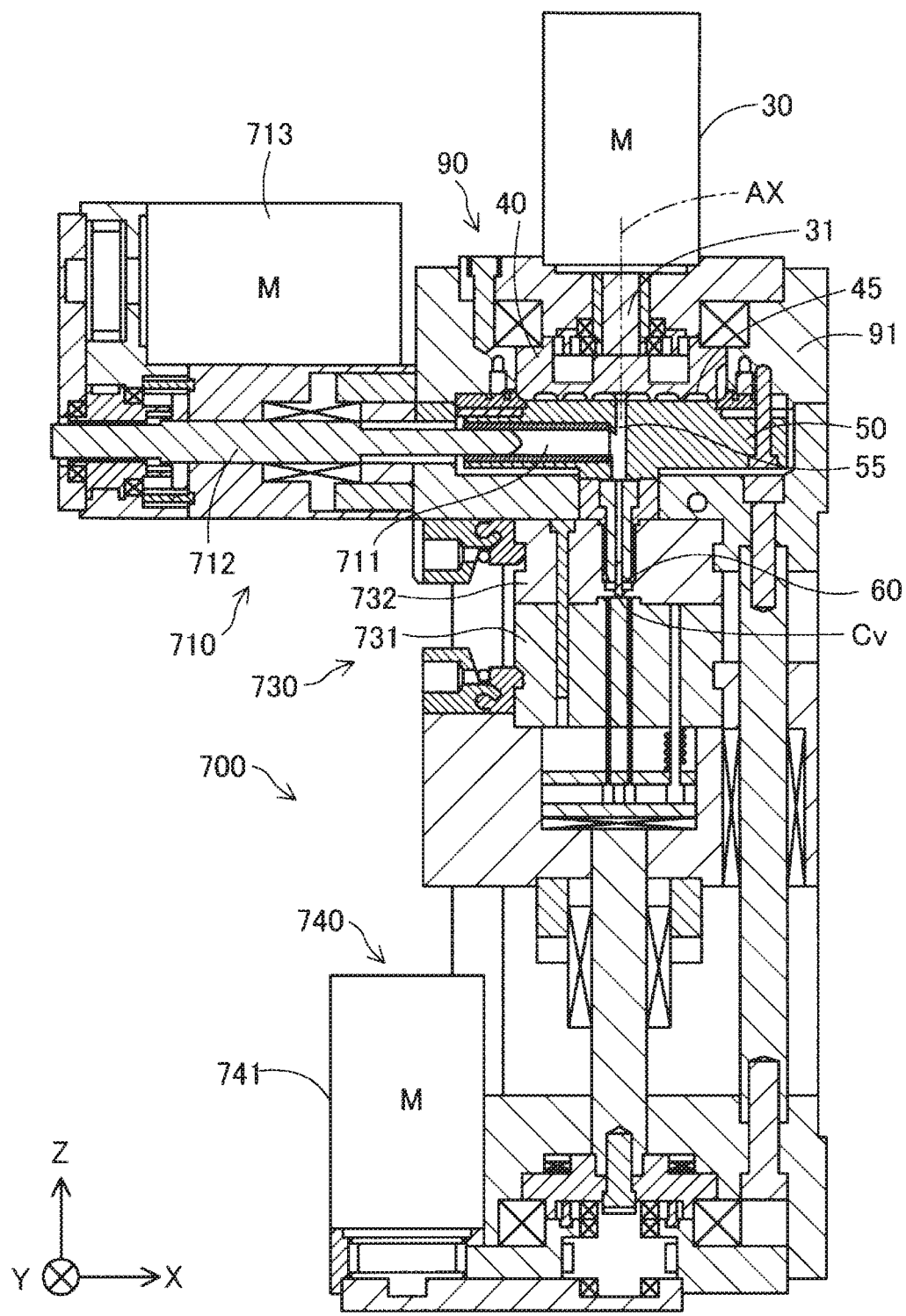
FIG. 18 is an explanatory view showing a schematic configuration of an injection molding device in a seventh embodiment.

FIG. 18 is an explanatory view showing the schematic configuration of an injection molding device 700 in a seventh embodiment. The injection molding device 700 of the present embodiment includes the plasticizing device 90 described in the first embodiment, an injection control mechanism 710, the nozzle 60, a mold portion 730, and a mold clamping device 740.

As described in the first embodiment, the plasticizing device 90 has the flat screw 40 and the barrel 50. The specific configurations of the flat screw 40 and the barrel 50 are the same as the configurations of the flat screw 40 and the barrel 50 of the first embodiment. The plasticizing device 90 plasticizes at least a part of a granular material supplied to the groove portion 45 of the flat screw 40 under the control of a command portion not shown, generates a fluid paste-form molten material, and guides the molten material to the injection control mechanism 710 from the communication hole 55.

The injection control mechanism 710 includes an injection cylinder 711, a plunger 712, and a plunger driving portion 713. The injection control mechanism 710 has a function of injecting the plasticized material in the injection cylinder 711 to a cavity Cv described below. The injection control mechanism 710 controls the amount of a material injected from the nozzle 60 under the control of the command portion not shown. The injection cylinder 711 is a substantially cylindrical member coupled to the communication hole 55 of the barrel 50 and includes the plunger 712 therein. The plunger 712 slides inside the injection cylinder 711 and sends the material in the injection cylinder 711 by pressure toward the nozzle 60 coupled to the plasticizing device 90. The plunger 712 is driven by the plunger driving portion 713 that is configured of a motor.

The mold portion 730 includes a movable mold 731 and a fixed mold 732. The movable mold 731 and the fixed mold 732 are provided so as to face each other and has the cavity Cv that is a space corresponding to the shape of a molded product therebetween. The plasticized material is sent by pressure by the injection control mechanism 710 and injected into the cavity Cv through the nozzle 60.

The mold clamping device 740 includes a mold driving portion 741 and has a function of opening and closing the movable mold 731 and the fixed mold 732. The mold clamping device 740 drives the mold driving portion 741, moves the movable mold 731, and opens and closes the mold portion 730 under the control of the control portion not shown.

The injection molding device 700 according to the seventh embodiment includes the plasticizing device 90 having the same configuration as the first embodiment as described above. Therefore, it is possible to suppress the temperature of the flat screw 40 becoming too high. Therefore, it is possible to stabilize the flow rate of the molten material that is sent out from the communication hole 55 and stabilize the amount of the molten material injected from the nozzle 60. Furthermore, in the injection molding device 700, instead of the plasticizing device 90 of the first embodiment, the plasticizing devices 90b, 90c, 90d, 90e, and 90f described in the respective embodiments other than the first embodiment may be mounted.

H. Other Embodiments (H1) In the above-described three-dimensional modeling devices 100c, 100d, 100e, and 100f of the third embodiment to the sixth embodiment, the heat conduction suppression portion 140 is provided on the surfaces of the flat screws 40c, 40d, 40e, and 40f in the fixation hole 49. In contrast, the heat conduction suppression portion 140 may not be provided on the surfaces of the flat screws 40c, 40d, 40e, and 40f in the fixation hole 49. In addition, the heat conduction suppression portion 140 may not be provided on the surfaces of the flat screws 40c, 40d, 40e, and 40f in the fixation hole 49, and the flat screws 40c, 40d, 40e, and 40f may be coupled to the rotary shaft 31 through the heat conduction suppression portion 140b and the coupling portion 32 described in the second embodiment.

(H2) In the above-described three-dimensional modeling devices 100, 100b, 100c, and 100d of the first embodiment to the fourth embodiment, the heat conduction suppression portion 140 is provided on the top surfaces 41 of the flat screws 40, 40b, 40c, and 40d facing the screw case 91. In contrast, the heat conduction suppression member 140 may not be provided on the top surfaces 41 of the flat screws 40, 40b, 40c, and 40d.

(H3) In the above-described three-dimensional modeling devices 100, 100b, 100c, 100d, 100e, and 100f of the respective embodiments, the heat conduction suppression member 140 is provided on the side surfaces 43 of the flat screws 40, 40b, 40c, 40d, 40e, and 40f facing the screw case 91. In contrast, the heat conduction suppression member 140 may not be provided on the side surfaces 43 of the flat screws 40, 40b, 40c, 40d, 40e, and 40f.

I. Other Aspects

The present disclosure is not limited to the above-described embodiments and can be realized in a variety of aspects within the scope of the gist of the present disclosure. For example, the present disclosure can also be realized by the following aspects. Technical features in the above-described embodiments corresponding to technical features in the respective aspects described below can be appropriately replaced or combined together in order to solve part or all of the problems of the present disclosure or to achieve part or all of the effects of the present disclosure. In addition, the technical features can be appropriately deleted as long as the technical features are described as essential features in the present specification.

(1) According to a first aspect of the present disclosure, a plasticizing device that plasticizes a material to produce a molten material is provided. This plasticizing device includes a driving motor having a rotary shaft, a screw that has a grooved surface on which a groove is formed and rotates by the driving motor, and a barrel having a facing surface that faces the grooved surface and has a communication hole formed in the center and a heater. At least a part of the rotary shaft is coupled to the screw through a heat conduction suppression portion that suppresses the conduction of heat.

According to the plasticizing device of this aspect, it is possible to suppress the conduction of heat from the driving motor to the screw through the rotary shaft, and thus it is possible to suppress the temperature of the screw becoming too high. Therefore, it is possible to stabilize the amount of the molten material ejected from the communication hole.

(2) In the plasticizing device of the first aspect, the heat conductivity of the heat conduction suppression portion may be set to be smaller than a heat conductivity of the rotary shaft or a heat conductivity of the screw.

According to the plasticizing device of this aspect, it is possible to reliably suppress the conduction of heat from the driving motor to the screw through the rotary shaft.

(3) In the plasticizing device of the first aspect, a fixation hole for coupling the rotary shaft and the screw may be provided in the screw, and the heat conduction suppression portion may be provided on a surface of the screw in the fixation hole.

According to the plasticizing device of this aspect, it is possible to suppress the conduction of heat from the driving motor to the screw through the rotary shaft using a simple configuration.

(4) In the plasticizing device of the first aspect, furthermore, the rotary shaft may be coupled to the screw through a coupling portion, and the heat conduction suppression portion may be provided between the rotary shaft and the coupling portion.

According to the plasticizing device of this aspect, the rotary shaft of the driving motor is coupled to the flat screw through the heat conduction suppression portion and the coupling portion, and thus it is possible to suppress the conduction of heat from the driving motor to the screw.

(5) The plasticizing device of the first aspect may further include a case that accommodates the screw, and the heat conduction suppression portion may be further provided on a surface of the screw facing the case.

According to the plasticizing device of this aspect, it is possible to suppress the conduction of heat from the case to the screw, and thus it is possible to further suppress the temperature of the screw becoming too high.

(6) In the plasticizing device of the first aspect, the heat conduction suppression portion may also suppress conduction of heat by being cooled by a cooling mechanism.

According to the plasticizing device of this aspect, the heat conduction suppression portion is cooled, and thus it is possible to suppress the conduction of heat from the driving motor to the screw through the rotary shaft.

(7) According to a second aspect of the present disclosure, a three-dimensional modeling device is provided. This three-dimensional modeling device includes a nozzle that ejects a modeling material, a plasticizing device that plasticizes a material to produce the modeling material and supplies the modeling material to the nozzle, and a control portion that controls the plasticizing device. The plasticizing device includes a driving motor having a rotary shaft, a screw that has a grooved surface on which a groove is formed and rotates by the driving motor, and a barrel having a facing surface that faces the grooved surface and has a communication hole formed in the center and a heater. At least a part of the rotary shaft is coupled to the screw through a heat conduction suppression portion that suppresses the conduction of heat.

According to the three-dimensional modeling device of this aspect, it is possible to suppress the conduction of heat from the driving motor to the screw through the rotary shaft, and thus it is possible to suppress the temperature of the screw becoming too high. Therefore, it is possible to stabilize the amount of the modeling material ejected from the nozzle.

(8) According to a third aspect of the present disclosure, an injection molding device is provided. This injection molding device includes a nozzle that ejects a molten material, a plasticizing device that plasticizes a material to produce the molten material and supplies the molten material to the nozzle, and a control portion that controls the plasticizing device. The plasticizing device includes a driving motor having a rotary shaft, a screw that has a grooved surface on which a groove is formed and rotates by the driving motor, and a barrel having a facing surface that faces the grooved surface and has a communication hole formed in the center and a heater. At least a part of the rotary shaft is coupled to the screw through a heat conduction suppression portion that suppresses the conduction of heat.

According to the injection molding device of this aspect, it is possible to suppress the conduction of heat from the driving motor to the screw through the rotary shaft, and thus it is possible to suppress the temperature of the screw becoming too high. Therefore, it is possible to stabilize the amount of the molten material ejected from the nozzle.

(1) According to a fourth aspect of the present disclosure, a plasticizing device that plasticizes a material to produce a molten material is provided. This plasticizing device includes a driving motor, a screw that has a grooved surface on which a groove is formed and rotates by the driving motor, and a barrel having a facing surface that faces the grooved surface and has a communication hole formed in the center and a heater. The screw has a cooling medium flow path provided inside the screw, an inlet portion that communicates with the cooling medium flow path and introduces a cooling medium from the outside of the screw, and an outlet portion that communicates with the cooling medium flow path and discharges the cooling medium to the outside of the screw.

According to the plasticizing device of this aspect, it is possible to cool the screw by circulating a cooling medium in the cooling medium flow path provided inside the screw, and thus it is possible to suppress the temperature of the screw becoming too high. Therefore, it is possible to stabilize the amount of the molten material ejected from the communication hole.

(2) In the plasticizing device of the fourth aspect, the outlet portion may be provided closer to the central side of the screw than the inlet portion.

According to the plasticizing device of this aspect, it is possible to effectively cool the outer circumferential side of the screw by circulating a cooling medium in the screw from the outer circumferential side toward the central side. Therefore, it is possible to maintain an appropriate balance between the plasticizing and the transportation of the material.

(3) The plasticizing device of the fourth aspect may further include a case that accommodates the screw, an annular case-side groove portion may be provided on a surface of the case facing the screw, an annular screw-side groove portion that communicates with the cooling medium flow path may be provide on a surface of the screw facing the case-side groove portion, in at least any one of the screw and the case, an outer circumferential seal member that seals a portion between an outer circumferential edge of the screw-side groove portion and an outer circumferential edge of the case-side groove portion and an inner circumferential seal member that seals a portion between an inner circumferential edge of the screw-side groove portion and an inner circumferential edge of the case-side groove portion may be provided, and the cooling medium may be circulated in a space surrounded by the screw-side groove portion, the case-side groove portion, the outer circumferential seal member, and the inner circumferential seal member.

According to the plasticizing device of this aspect, it is possible to continuously supply the cooling medium to the cooling medium flow path through the space surrounded by the screw-side groove portion, the case-side groove portion, the outer circumferential seal portion, and the inner circumferential seal portion even during the rotation of the screw.

(4) In the plasticizing device of the fourth aspect, a heat conduction suppression portion may be provided on a surface of the screw facing the case.

According to the plasticizing device of this aspect, it is possible to suppress the conduction of heat from the case to the screw, and thus it is possible to further suppress the temperature of the screw becoming too high.

(5) In the plasticizing device of the fourth aspect, the driving motor may have a rotary shaft, and an in-shaft flow path that communicates with the cooling medium flow path may be formed inside the rotary shaft.

According to the plasticizing device of this aspect, it is possible to continuously supply the cooling medium to the cooling medium flow path through the in-shaft flow path even during the rotation of the screw.

(6) According to a fifth aspect of the present disclosure, a three-dimensional modeling device is provided. This three-dimensional modeling device includes a nozzle that ejects a modeling material, a plasticizing device that plasticizes a material to produce the modeling material and supplies the modeling material to the nozzle, and a control portion that controls the plasticizing device. The plasticizing device includes a driving motor, a screw that has a grooved surface on which a groove is formed and rotates by the driving motor, and a barrel having a facing surface that faces the grooved surface and has a communication hole formed in the center and a heater. The screw has a cooling medium flow path provided inside the screw, an inlet portion that communicates with the cooling medium flow path and introduces a cooling medium from the outside of the screw, and an outlet portion that communicates with the cooling medium flow path and discharges the cooling medium to the outside of the screw.

According to the three-dimensional modeling device of this aspect, the screw can be cooled by circulating the cooling medium in the cooling medium flow path provided inside the screw, and thus it is possible to suppress the temperature of the screw becoming too high. Therefore, it is possible to stabilize the amount of the modeling material ejected from the nozzle.

(7) The three-dimensional modeling device of the fifth aspect may include a cooling medium pump that supplies the cooling medium to the cooling medium flow path and a temperature sensor that acquires a temperature of the screw, and, when the temperature acquired by the temperature sensor is equal to or higher than a predetermined temperature, the control portion may drive the cooling medium pump, thereby supplying the cooling medium to the cooling medium flow path.

According to the three-dimensional modeling device of this aspect, when the temperature of the screw is equal to or higher than the predetermined temperature, the control portion drives the cooling medium pump, and thus it is possible to suppress the temperature of the screw becoming too high and reduce power consumption during a period in which the screw rotates more than a case where the cooling medium pump is driven at all times.

(8) According to a sixth aspect of the present disclosure, an injection molding device is provided. This injection molding device includes a nozzle that ejects a molten material, a plasticizing device that plasticizes a material to produce the molten material and supplies the molten material to the nozzle, and a control portion that controls the plasticizing device. The plasticizing device includes a driving motor, a screw that has a grooved surface on which a groove is formed and rotates by the driving motor, and a barrel having a facing surface that faces the grooved surface and has a communication hole formed in the center and a heater. The screw has a cooling medium flow path provided inside the screw, an inlet portion that communicates with the cooling medium flow path and introduces a cooling medium from the outside of the screw, and an outlet portion that communicates with the cooling medium flow path and discharges the cooling medium to the outside of the screw.

According to the injection molding device of this aspect, the screw can be cooled by circulating the cooling medium in the cooling medium flow path provided inside the screw, and thus it is possible to suppress the temperature of the screw becoming too high. Therefore, it is possible to stabilize the amount of the molten material ejected from the nozzle.

(1) According to a seventh aspect of the present disclosure, a plasticizing device that plasticizes a material to produce a molten material is provided. This plasticizing device includes a driving motor having a rotary shaft, a screw that has a grooved surface on which a groove is formed and rotates by the driving motor, a barrel having a facing surface that faces the grooved surface and has a communication hole formed in the center and a heater, and a case that accommodates the screw. The screw has a Peltier device in the screw.

According to the plasticizing device of this aspect, the screw can be cooled using the Peltier device, and thus it is possible to suppress the temperature of the screw becoming too high. Therefore, it is possible to stabilize the amount of the molten material ejected from the communication hole.

(2) In the plasticizing device of the seventh aspect, the case may have a first contact electrically coupled to a power supply through a first wire, the screw may have a second contact electrically coupled to the Peltier device through a second wire, the first contact or the second contact may be formed in an annular shape, and the first contact and the second contact may be electrically coupled to each other by bringing the first contact and the second contact into contact with each other.

According to the plasticizing device of this aspect, it is possible to supply electric currents to the Peltier device from a power supply provided outside the screw even during the rotation of the screw.

(3) In the plasticizing device of the seventh aspect, the rotary shaft may have a wire for supplying electric currents to the Peltier device.

According to the plasticizing device of this aspect, the wire for supplying electric currents to the Peltier device passes through the inside of the rotary shaft of the driving motor, and thus it is possible to supply electric currents to the Peltier device from the outside of the screw even during the rotation of the screw.

(4) In the plasticizing device of the seventh aspect, the case may have an opening portion that communicates with the atmosphere.

According to the plasticizing device of this aspect, it is possible to emit heat to the outside of the case through the opening portion, and thus it is possible to improve the screw-cooling effect.

(5) In the plasticizing device of the seventh aspect, the Peltier device may be disposed in an annular shape along a circumferential direction of the screw.

According to the plasticizing device of this aspect, it is possible to more effectively cool the outer circumferential side of the screw than the central portion of the screw. Therefore, it is possible to maintain an appropriate balance between the plasticizing and the transportation of the material.

(6) In the plasticizing device of the seventh aspect, a heat conduction suppression portion may be provided on a surface of the screw facing the case.

According to the plasticizing device of this aspect, it is possible to suppress the conduction of heat from the case to the screw, and thus it is possible to suppress the temperature of the screw becoming too high.

(7) According to an eighth aspect of the present disclosure, a three-dimensional modeling device is provided. This three-dimensional modeling device includes a nozzle that ejects a modeling material, a plasticizing device that plasticizes a material to produce the modeling material and supplies the modeling material to the nozzle, and a control portion that controls the plasticizing device. The plasticizing device includes a driving motor having a rotary shaft, a screw that has a grooved surface on which a groove is formed and rotates by the driving motor, a barrel having a facing surface that faces the grooved surface and has a communication hole formed in the center and a heater, and a case that accommodates the screw. The screw has a Peltier device in the screw.

According to the three-dimensional modeling device of this aspect, the screw can be cooled using the Peltier device, and thus it is possible to suppress the temperature of the screw becoming too high. Therefore, it is possible to stabilize the amount of the modeling material ejected from the nozzle.

(8) The three-dimensional modeling device of the eighth aspect may include a power supply that supplies electric currents to the Peltier device and a temperature sensor that acquires a temperature of the screw, and, when the temperature acquired by the temperature sensor is equal to or higher than a predetermined temperature, the control portion may supply the electric currents to the Peltier device from the power supply.

According to the three-dimensional modeling device of this aspect, when the temperature of the screw is equal to or higher than the predetermined temperature, the control portion supplies electric currents to the Peltier device from the power supply, and thus it is possible to suppress the temperature of the screw becoming too high and reduce power consumption during a period in which the screw rotates more than a case where electric currents is supplied to the Peltier device at all times.

(9) According to a ninth aspect of the present disclosure, an injection molding device is provided. This injection molding device includes a nozzle that ejects a molten material, a plasticizing device that plasticizes a material to produce the molten material and supplies the molten material to the nozzle, and a control portion that controls the plasticizing device. The plasticizing device includes a driving motor having a rotary shaft, a screw that has a grooved surface on which a groove is formed and rotates by the driving motor, a barrel having a facing surface that faces the grooved surface and has a communication hole formed in the center and a heater, and a case that accommodates the screw. The screw has a Peltier device in the screw.

According to the injection molding device of this aspect, the screw can be cooled using the Peltier device, and thus it is possible to suppress the temperature of the screw becoming too high. Therefore, it is possible to stabilize the amount of the modeling material ejected from the nozzle.

The present disclosure can also be realized in a variety of aspects other than the plasticizing device. For example, the present disclosure can be realized in an aspect of a three-dimensional modeling device, an injection molding device, an ejection unit, or the like.

What is claimed is:

1. A plasticizing device that plasticizes a material to produce a molten material, the plasticizing device comprising:

a driving motor;
a screw that has a grooved surface on which a groove is formed and rotates by the driving motor; and
a barrel having a facing surface that faces the grooved surface and has a communication hole formed in the center and a heater, wherein
the screw has a cooling medium flow path provided inside the screw, an inlet portion that communicates with the cooling medium flow path and introduces a cooling medium from the outside of the screw, and an outlet portion that communicates with the cooling medium flow path and discharges the cooling medium to the outside of the screw,
wherein the outlet portion is provided closer to a center axis of the screw than the inlet portion.

2. The plasticizing device according to claim 1, further comprising:

a case that accommodates the screw, wherein
an annular case-side groove portion is provided on a surface of the case facing the screw,
an annular screw-side groove portion that communicates with the cooling medium flow path is provided on a surface of the screw facing the case-side groove portion,
in at least any one of the screw and the case, an outer circumferential seal member that seals a portion between an outer circumferential edge of the screw-side groove portion and an outer circumferential edge of the case-side groove portion and an inner circumferential seal member that seals a portion between an inner circumferential edge of the screw-side groove portion and an inner circumferential edge of the case-side groove portion are provided, and
the cooling medium is circulated in a space surrounded by the screw-side groove portion, the case-side groove portion, the outer circumferential seal member, and the inner circumferential seal member.

3. The plasticizing device according to claim 2, wherein a heat conduction suppression portion is provided on a surface of the screw facing the case.

4. The plasticizing device according to claim 1, wherein the driving motor has a rotary shaft, and
an in-shaft flow path that communicates with the cooling medium flow path is formed inside the rotary shaft.

5. A three-dimensional modeling device comprising:

a nozzle that ejects a modeling material;
a plasticizing device that plasticizes a material to produce the modeling material and supplies the modeling material to the nozzle; and
a control portion that controls the plasticizing device, wherein
the plasticizing device includes
a driving motor,
a screw that has a grooved surface on which a groove is formed and rotates by the driving motor, and
a barrel having a facing surface that faces the grooved surface and has a communication hole formed along a center axis of the barrel and a heater, and
the screw has a cooling medium flow path provided inside the screw, an inlet portion that communicates with the cooling medium flow path and introduces a cooling medium from outside of the screw, and an outlet portion that communicates with the cooling medium flow path and discharges the cooling medium to the outside of the screw,
wherein the outlet portion is provided closer to a center axis of the screw than the inlet portion.

6. The three-dimensional modeling device according to claim 2, further comprising:
   a cooling medium pump that supplies the cooling medium to the cooling medium flow path; and
   a temperature sensor that acquires a temperature of the screw, wherein
   when the temperature acquired by the temperature sensor is equal to or higher than a predetermined temperature, the control portion drives the cooling medium pump, thereby supplying the cooling medium to the cooling medium flow path.

7. An injection molding device comprising:
a nozzle that ejects a molten material;
a plasticizing device that plasticizes a material to produce the molten material and supplies the molten material to the nozzle; and
a control portion that controls the plasticizing device, wherein
   the plasticizing device includes
      a driving motor,
      a screw that has a grooved surface on which a groove is formed and rotates by the driving motor, and
      a barrel having a facing surface that faces the grooved surface and has a communication hole formed along a center axis of the barrel and a heater, and
   the screw has a cooling medium flow path provided inside the screw, an inlet portion that communicates with the cooling medium flow path and introduces a cooling medium from outside of the screw, and an outlet portion that communicates with the cooling medium flow path and discharges the cooling medium to the outside of the screw,
   wherein the outlet portion is provided closer to a center axis of the screw than the inlet portion.

* * * * *